(12) United States Patent
Saito et al.

(10) Patent No.: US 10,686,604 B2
(45) Date of Patent: Jun. 16, 2020

(54) KEY DEVICE, KEY CLOUD SYSTEM, DECRYPTION METHOD, AND PROGRAM

(71) Applicant: NIPPON TELEGRAPH AND TELEPHONE CORPORATION, Chiyoda-ku (JP)

(72) Inventors: Tsunekazu Saito, Musashino (JP); Go Yamamoto, Musashino (JP); Tetsutaro Kobayashi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 734 days.

(21) Appl. No.: 15/027,718

(22) PCT Filed: Oct. 7, 2014

(86) PCT No.: PCT/JP2014/076782
§ 371 (c)(1),
(2) Date: Apr. 7, 2016

(87) PCT Pub. No.: WO2015/056601
PCT Pub. Date: Apr. 23, 2015

(65) Prior Publication Data
US 2016/0254914 A1  Sep. 1, 2016

(30) Foreign Application Priority Data
Oct. 16, 2013  (JP) .................................. 2013-215391

(51) Int. Cl.
*H04L 29/06* (2006.01)
*H04L 9/32* (2006.01)
(Continued)

(52) U.S. Cl.
CPC ............ *H04L 9/3242* (2013.01); *H04L 9/088* (2013.01); *H04L 9/0894* (2013.01);
(Continued)

(58) Field of Classification Search
None
See application file for complete search history.

(56) References Cited

U.S. PATENT DOCUMENTS 5,442,708 A * 8/1995 Adams, Jr. ............. H04L 29/06
370/401
5,640,456 A 6/1997 Adams, Jr.
(Continued)

FOREIGN PATENT DOCUMENTS

CN 101272241 A 9/2008
CN 101473626 A 7/2009
(Continued)

OTHER PUBLICATIONS

International Search Report dated Jan. 13, 2015 in PCT/JP2014/076782 filed on Oct. 7, 2014.
(Continued)

*Primary Examiner* — Jeffery L Williams
(74) *Attorney, Agent, or Firm* — Oblon, McClelland, Maier & Neustadt, L.L.P.

(57) ABSTRACT

Registered network-based identification corresponding to any of networks is stored in a key device 12. A terminal device 11 sends ciphertext and network-based identification to the key device 12, using a network. The key device 12 receives the sent ciphertext and network-based identification and outputs response information corresponding to a decrypted value of the ciphertext when the network-based identification corresponds to the registered network-based identification. The terminal device 11 obtains the decrypted value from the response information.

11 Claims, 9 Drawing Sheets

(51) Int. Cl.
*H04L 9/08* (2006.01)
*H04L 29/08* (2006.01)

(52) U.S. Cl.
CPC .......... *H04L 63/0428* (2013.01); *H04L 63/06* (2013.01); *H04L 63/0876* (2013.01); *H04L 67/1097* (2013.01)

(56) References Cited

U.S. PATENT DOCUMENTS

| | | | |
|---|---|---|---|
| 8,180,049 B2* | 5/2012 | B. Gentry | H04L 9/3073 380/277 |
| 9,219,714 B2* | 12/2015 | Yoon | H04L 9/3073 |
| 9,374,346 B2* | 6/2016 | Larson | H04L 29/12066 |
| 2004/0236939 A1 | 11/2004 | Watanabe et al. | |
| 2006/0095771 A1* | 5/2006 | Appenzeller | H04L 9/006 713/171 |
| 2007/0234404 A1 | 10/2007 | Bogdanovic et al. | |
| 2008/0263357 A1* | 10/2008 | Boyen | H04L 9/083 713/168 |
| 2009/0129599 A1 | 5/2009 | Garcia et al. | |
| 2009/0175448 A1 | 7/2009 | Watanabe et al. | |
| 2009/0175449 A1 | 7/2009 | Watanabe et al. | |
| 2009/0175454 A1 | 7/2009 | Watanabe et al. | |
| 2009/0180493 A1* | 7/2009 | Hirano | H04L 12/185 370/464 |
| 2009/0208013 A1 | 8/2009 | Watanabe et al. | |
| 2010/0017593 A1* | 1/2010 | Putz | H04L 9/3073 713/150 |
| 2011/0231649 A1 | 9/2011 | Bollay et al. | |
| 2011/0231651 A1 | 9/2011 | Bollay | |
| 2011/0231652 A1 | 9/2011 | Bollay et al. | |
| 2011/0231653 A1 | 9/2011 | Bollay et al. | |
| 2011/0231655 A1 | 9/2011 | Bollay et al. | |
| 2011/0231923 A1 | 9/2011 | Bollay et al. | |
| 2012/0323981 A1 | 12/2012 | Yamamoto et al. | |
| 2013/0064241 A1* | 3/2013 | Larson | H04L 29/12066 370/352 |
| 2013/0318360 A1 | 11/2013 | Yamamoto et al. | |
| 2013/0339413 A1 | 12/2013 | Yamamoto et al. | |
| 2014/0208104 A1* | 7/2014 | Yoon | H04L 9/3073 713/168 |
| 2016/0254914 A1* | 9/2016 | Saito | H04L 9/08 713/153 |

FOREIGN PATENT DOCUMENTS

| | | |
|---|---|---|
| JP | 2004-297783 A | 10/2004 |
| JP | 2009-258816 A | 11/2009 |
| JP | 2009-542118 A | 11/2009 |
| JP | 2010-154193 A | 7/2010 |
| JP | 2012-151756 A | 8/2012 |
| JP | 2013-105250 A | 5/2013 |
| JP | 2013-523050 A | 6/2013 |
| WO | 2011/086992 A1 | 7/2011 |
| WO | 2011/116342 A2 | 9/2011 |
| WO | 2012/057134 A1 | 5/2012 |
| WO | 2012/121152 A1 | 9/2012 |

OTHER PUBLICATIONS

"NTT Data developed authentication-connected function using NGN network-based identification-established simple mechanism for providing security" 2009 News Release, NTT Data, http://www.nttdata.com/jp/ja/news/release/2009/091600.html, 2009, 6 pages (with partial English language translation).

Nir Yosef, et al., "Improved network-based identification of protein orthologs" Oxford Journals, Science & Mathematics Bioinformatics, vol. 24, No. 16, 2008, pp. i200-i206.

"Network-based identification notification function", Nippon Telegraph and Telephone East Corporation, FLET'S web page, https://flets.com/asc/s_outline.html, 2015, 4 pages (with partial English language translation).

Dan Boneh, et al., "Hierarchical Identity Based Encryption with Constant Size Ciphertext" Advances in Cryptology-EUROCRYPT, Lecture Notes in Computer Science, 2005, 17 pages.

D.W. Davies, et al., "Security for Computer Networks: An Introduction to Data Security in Teleprocessing and Electronic Funds Transfer" Wiley-Interscience Publication, 1984, 17 pages (with English language translation).

Yuto Kawahara, et al., "Implementation of Decryption with Self-corrector in Pairing-based Cryptosystems" 2011 Symposium on Cryptography and Information Security, The Institute of Electronics, Information and Communication Engineers, 2011, 11 pages (with partial English language translation).

Extended European Search Report dated May 10, 2017 in Patent Application No. 14854587.4.

Japanese Office Action dated Apr. 25, 2017 in Patent Application No. 2015-542581 (with English translation).

Office Action dated Oct. 11, 2016 in Japanese Patent Application No. 2015-542581 (with English language translation).

Combined Chinese Office Action and Search Report dated Jun. 11, 2018 in Chinese Patent Application No. 201480055975.2 (with English translation), 17 pages.

Chinese Office Action dated Mar. 1, 2019 in Chinese Patent Application No. 201480055975.2 (with English translation), 14 pages.

* cited by examiner

KEY DEVICE, KEY CLOUD SYSTEM, DECRYPTION METHOD, AND PROGRAM

TECHNICAL FIELD

The present invention relates to decryption technology of the cloud key management type.

BACKGROUND ART

Patent literature 1 discloses a cloud-key-management-type decryption technology that stores, in a key device, registered permission information corresponding to a terminal device to which a decryption authority is given, allows the key device to receive ciphertext and terminal information, and outputs response information corresponding to the decrypted result of the ciphertext when the terminal information corresponds to any of the registered permission information.

PRIOR ART LITERATURE

Patent Literature

Patent literature 1: Japanese Patent Application Laid Open No. 2012-151756

SUMMARY OF THE INVENTION

Problems to be Solved by the Invention

With the technology disclosed in Patent literature 1, the registered permission information corresponding to individual terminal devices is stored in the key device, and each terminal device is individually given a decryption authority. Therefore, even if a plurality of terminal devices is connected to a single network, the decryption authority needs to be given to each terminal device individually. Since the registered permission information is information exclusive to the cloud-key-management-type decryption, the registered permission information can be stored in the key device only after the terminal device is set up for cloud-key-management-type decryption. That is, the terminal device can be given a decryption authority only after the terminal device is set up for the cloud-key-management-type decryption.

An object of the present invention is to increase convenience concerning the handling of the decryption authority.

Means to Solve the Problems

Registered network-based identification corresponding to any of networks is stored in a key device; the key device receives ciphertext and network-based identification; when the network-based identification corresponds to the registered network-based identification, response information corresponding to a decrypted value of the ciphertext is output.

Effects of the Invention

Since each network is given a decryption authority individually, even if a plurality of terminal devices is connected to a single network, the need for giving the decryption authority individually to each terminal device is eliminated. Moreover, since the decryption authority is given to the network, the decryption authority can be given to a terminal device even before the terminal device is set up for cloud-key-management-type decryption. Consequently, convenience concerning the handling of the decryption authority is improved.

DETAILED DESCRIPTION OF THE EMBODIMENTS

Embodiments of the present invention will be described below with reference to the drawings.

First Embodiment

A first embodiment of the present invention will now be described.
<Configuration>

Figure 1:
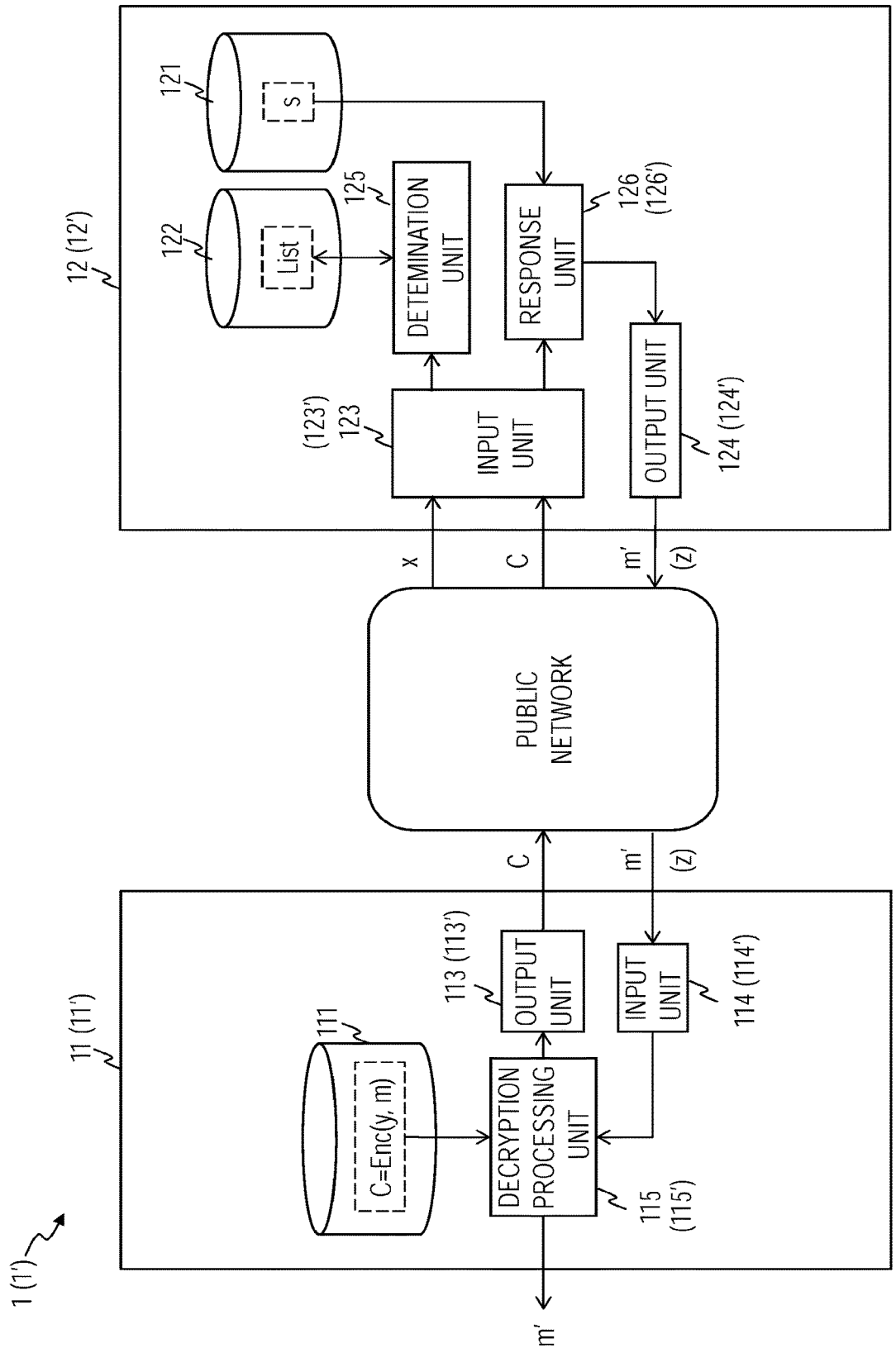
FIG. 1 is a block diagram showing the functional configurations of key cloud systems according to a first embodiment and a modification thereof.

The configuration of this embodiment will now be described. As shown in FIG. 1, a key cloud system 1 according to this embodiment includes a terminal device 11 and a key device 12. The terminal device 11 and the key device 12 are configured such that they can communicate through a public network having a network-based authentication function and a network-based identification notification function.

Network-based authentication is a user authentication technique for confirming that the user is accessing for communication from the network. Network-based authentication is already known and is disclosed in Reference 1 (NTT Data developed authentication-connected function using NGN network-based identification—established simple mechanism for providing security, [online], NTT Data Corporation, [searched on Mar. 21, 2013], Internet http://www.nttdata.com/jp/ja/news/release/2009/091600.html), US Patent Application Publication No. 2007-0234404, and the like. When the terminal device 11 communicates with the key device 12, using a specific network of the public networks, the network-based identification corresponding to the network used by the terminal device 11 is sent to an authentication apparatus. An example of the network-based identification is disclosed in 'Nir Yosef, Roded Sharan, and William Stafford Noble, "Improved network-based identification of protein orthologs," Oxford Journals, Science & Mathematics Bioinformatics, Volume 24, Issue 16, pp. i200-i206, http://bioinformatics.oxfordjournals.org/content/24/16/i200, for example. If the authentication apparatus succeeds in network-based authentication, the terminal device 11 can communicate with the key device 12 through the network. If the authentication apparatus fails in network-based authentication, the terminal device 11 cannot communicate with the key device 12 through the network. Examples of network-based authentication include network-based authentication of the NGN (next generation network) and EAP-SI authentication. Examples of the network-based identification include a unique identifier of a device connected to the network, the MAC address of a gateway (home gateway, etc.), a FLET'S number (registered trademark), an IMSI (International Mobile Subscriber Identity), an email address, and a department name.

The network-based identification notification function is a function that notifies, in communication using a network, the network-based identification of the network to a destination device. The network-based identification notification function is also known and disclosed in Reference literature 2 ("Network-based identification notification function," [on-line], Nippon Telegraph and Telephone East Corporation, FLET'S web page, [searched on Mar. 21, 2013], Internet http://flets.com/asc/s_outline.html), and the like. When the terminal device 11 communicates with the key device 12 through a network, the network-based identification of the network is reported to the key device 12.

As shown in FIG. 1, the terminal device 11 in this embodiment includes a storage 111, an output unit 113, an input unit 114, and a decryption processing unit 115. The key device 12 includes storages 121 and 122, an input unit 123, an output unit 124, a determination unit 125, and a response unit 126. The devices are configured by reading a predetermined program into a general-purpose or special-purpose computer that includes a processor (hardware processor) such as a CPU (central processing unit) and memories such as a RAM (random-access memory) and a ROM (read-only memory), for example. The computer can include a single processor and a single memory or can include a plurality of processors and memories. The program can be installed in the computer and can also be recorded in the ROM or the like beforehand. All or some of the processing units can be configured by circuitry which implements processing functions without using programs, instead of circuitry, such as the CPU, that implements a functional configuration by reading a program. The circuitry which configures a single device can include a plurality of CPUs. Information output from each processing unit is stored in a temporary memory, which is not shown in the figure, and is read and used in the processing by the processing unit when necessary. Although FIG. 1 shows one each of the terminal device 11 and the key device 12, two or more terminal devices or key devices can be present. In that case, the two or more terminal devices or key devices may be connected to a single network.

<Preconditions for Decryption Processing>

In this embodiment, a key pair (y,s) formed of an encryption key y and a corresponding decryption key s is set up beforehand. The key pair (y,s) can be a key pair formed of a public key and a private key in a public-key encryption method, a pair formed of an identifier and a corresponding private key in an ID-based encryption method, a pair formed of an attribute vector and a corresponding private key in a function-type encryption method, or mutually equal common keys (symmetric keys) in a common-key encryption method, for example. The encryption key y is stored in an encryption apparatus, which is not shown in the figure, and the decryption key s is stored securely in the storage 121 (key storage) of the key device 12 (FIG. 1). The encryption apparatus, not shown in the figure, generates ciphertext C=Enc(y, m) by encrypting plaintext m by using the encryption key y, and the ciphertext C is stored in the storage 111 of the terminal device 11 (FIG. 1).

A network in which a decryption service is permitted is set up beforehand, and a list List of registered network-based identification corresponding to any of networks in which a decryption service is permitted is stored in the storage 122 (registered-network storage) of the key device 12. The registered network-based identification can be the network-based identification itself with which the decryption service is permitted or can also be information uniquely determined for the network-based identification with which the decryption service is permitted.

<Decryption Processing>

Figure 2:
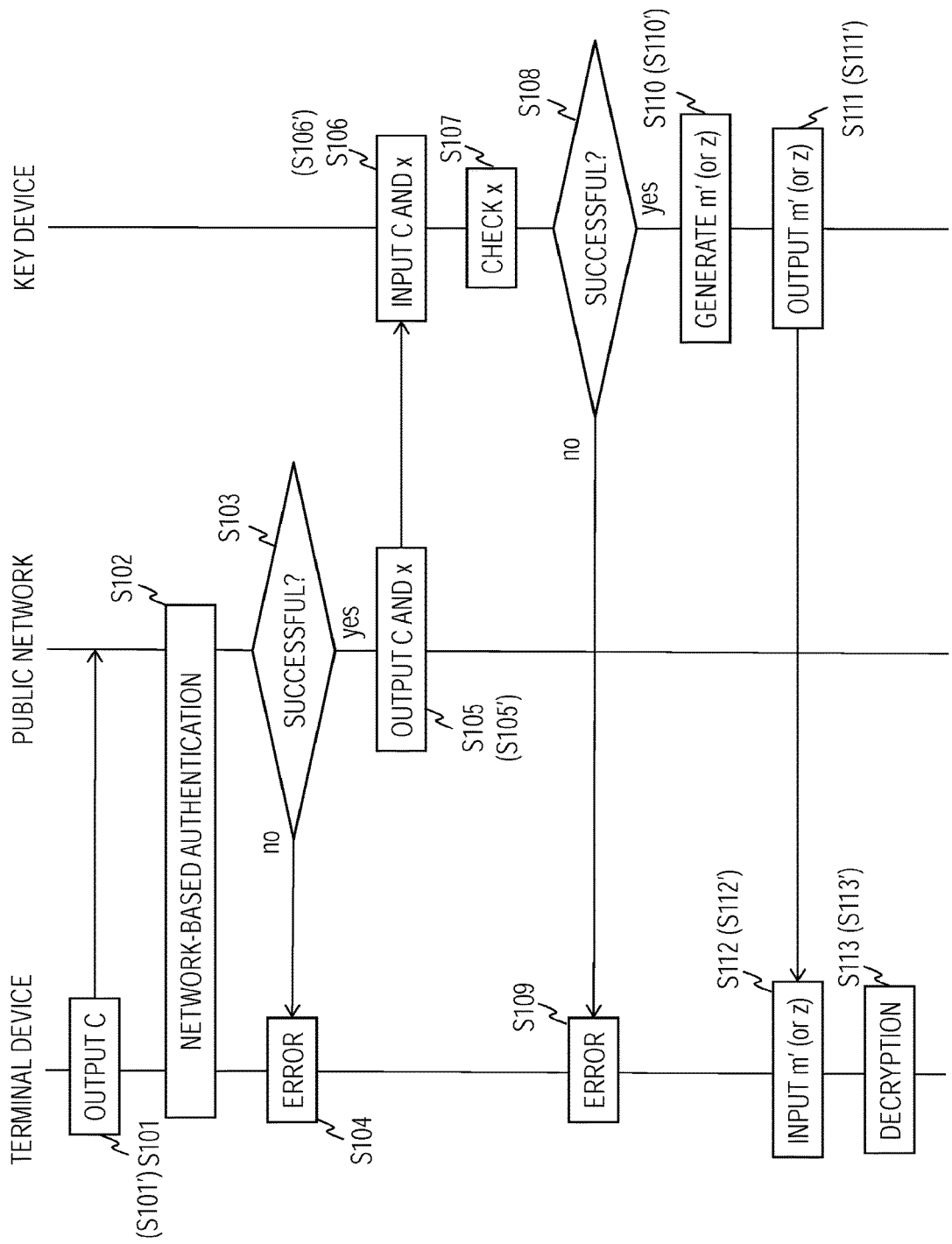
FIG. 2 is a sequence diagram illustrating decryption methods in the first embodiment and the modification thereof.

Decryption processing in this embodiment will be described with reference to FIG. 2. The decryption processing unit 115 in the terminal device 11 (FIG. 1) reads the ciphertext C from the storage 111 and outputs the ciphertext C. The ciphertext C is input to the output unit 113. The output unit 113 outputs the ciphertext C addressed to the key device 12, to a predetermined network of the public networks (step S101).

The network-based identification x of the network to which the ciphertext C has been output is sent to the authentication apparatus (not shown in the figure), which provides a network-based authentication function, and this authentication apparatus performs network-based authentication using the network-based identification x (step S102). If the network-based authentication fails (step S103), error information is sent to the terminal device 11. The sent error information is input to the input unit 114 and is sent to the decryption processing unit 115, and then, the decryption processing unit 115 finishes the decryption processing (step S104).

If the network-based authentication succeeds (step S103), the ciphertext C is sent to the key device 12, and a notification apparatus (not shown in the figure), which provides a network-based identification notification function, sends the network-based identification x to the key device 12 (step S105). The network-based identification x and the ciphertext C are input to the input unit 123 in the key device 12. The network-based identification x input to the input unit 123 is information corresponding to the network which has succeeded in network-based authentication. The network-based identification x is sent to the determination unit 125, and the ciphertext C is sent to the response unit 126 (step S106). The determination unit 125 determines whether the network-based identification x corresponds to any of registered network-based identification in the list List stored in the storage 122. For example, if network-based identification with which a decryption service is permitted is set itself to the registered network-based identification, the determination unit 125 determines whether the network-based identification x is included in the list List stored in the storage 122 (step S107). If the network-based identification x does not correspond to any registered network-based identification in the list List (for example, if the network-based identification x is not included in the list List) (step S108), the output unit 124 sends error information. The sent error information is input to the input unit 114 in the terminal device 11 and is sent to the decryption processing unit 115, and then, the decryption processing unit 115 finishes the decryption processing (step S109). If the network-based identification x corresponds to any of the registered network-based identification in the list List (for example, if the network-based identification x is included in the list List) (step S108), the response unit 126 decrypts the ciphertext C, using the decryption key s stored in the storage 121, and outputs a decrypted value m thereby obtained (step S110). The decrypted value m' is input to the output unit 124. The output unit 124 outputs the decrypted value m' (response information corresponding to the decrypted value) addressed to the terminal device 11, to the network corresponding to the network-based identification x (network-based identification corresponding to the registered network-based identification) (step S111).

The decrypted value m' is input to the input unit 114 in the terminal device 11 and is sent to the decryption processing unit 115 (step S112). The decryption processing unit 115 outputs the decrypted value m' and finishes the decryption processing (step S113).

Features of First Embodiment

Since each network is individually given the decryption authority in this embodiment, even if a plurality of terminal devices is connected to a single network, the decryption authority does not have to be given individually to each terminal device. In addition, since the decryption authority is given to the network, the decryption authority can be given also to the terminal device before it is set up exclusively for this system. In other words, even before a program for executing the decryption processing function in this embodiment is installed in the terminal device, the network-based identification corresponding to the network to be used by the terminal device can be identified, and a list that includes the registered network-based identification corresponding to the network can be stored in the key device. The network-based identification x input to the key device indicates that network-based authentication in the public network has succeeded. Therefore, the validity of the terminal device which has accessed the key device for connection by using the network corresponding to this network-based identification x is guaranteed.

Modification of First Embodiment

In a modification of the first embodiment, cloud-key-management-type decryption utilizing a self-correction technique can be performed. The self-correction technique is a technique for performing correct calculations at all times by using a calculating machine or system that does not always output correct calculation results (outputting correct calculation results when a calculating machine that outputs correct calculation results is used; and obtaining correct calculation results or obtaining a result indicating that the calculation is impossible when a calculating machine that does not always output correct results is used). In this modification, the terminal device sends information corresponding to second ciphertext obtained by encrypting the plaintext m, using the encryption key, to the key device as ciphertext C; when the network-based identification corresponds to registered network-based identification, the key device sends response information with which the terminal device obtains, by self-correction processing, a decrypted value that can be obtained by decrypting the second ciphertext with the decryption key; and the terminal device obtains the decrypted value m' by using the response information. The self-correction technique itself is a known technique and is disclosed in Reference literature 3 (International Publication WO 2012/057134), Reference literature 4 (International Publication WO 2011/086992), and Reference literature 5 (International Publication WO 2012/121152), for example. Generally, differences from the items explained above will be described below, and by using the same reference numerals for the items explained above, redundant explanation is avoided.

<Configuration>

The configuration of the modification will now be described. As shown in FIG. 1, a key cloud system 1' according to this modification includes a terminal device 11' and a key device 12'. The terminal device 11' and the key device 12' are configured such that they can communicate through a public network having a network-based authentication function and a network-based identification notification function.

As shown in FIG. 1, the terminal device 11' in this modification includes the storage 111, an output unit 113', an input unit 114', and a decryption processing unit 115'. The key device 12' includes the storages 121 and 122, an input unit 123', an output unit 124', the determination unit 125, and a response unit 126'. The devices are configured by reading a predetermined program into the computer described above. The information output from each processing unit is stored in a temporary memory not shown in the figure and is read and used for the processing in the processing unit when necessary. Although FIG. 1 shows one each of the terminal device 11' and the key device 12', two or more terminal devices or key devices can be present. In that case, the two or more terminal devices or key devices may be connected to a single network.

<Preconditions for Decryption Processing>

Same as in the first embodiment

<Decryption Processing>

Decryption processing in this modification will now be described with reference to FIG. 2. The decryption processing unit 115' in the terminal device 11' (FIG. 1) reads second ciphertext Enc(y, m) from the storage 111 and outputs information corresponding to the second ciphertext Enc(y, m) as ciphertext C. The ciphertext C in this modification is such information given to the key device 12' by the terminal device 11' that the terminal device 11' obtains from the key device 12' response information for obtaining a decrypted value m' of the ciphertext Enc(y, m) by self-correction processing. An example of ciphertext C is information obtained by disturbing the second ciphertext Enc(y, m). For example, the input information disclosed in Reference literature 3 to 5 can be the ciphertext C (step S101').

Then, the processing proceeds to steps S102 to S104 described in the first embodiment. However, the processing is performed by the terminal device 11', instead of the terminal device 11. If the network-based authentication succeeds (step S103), the ciphertext C is sent to the key device 12', and a notification apparatus (not shown in the figure), which provides the network-based identification notification function, further sends the network-based identification x to the key device 12' (step S105'). The network-based identification x and the ciphertext C are input to the input unit 123' in the key device 12'. The network-based identification x is sent to the determination unit 125, and the ciphertext C is sent to the response unit 126' (step S106').

Then, the processing proceeds to steps S107 to S109 described in the first embodiment. The processing, however, is performed by the terminal device 11' and the key device 12', instead of the terminal device 11 and the key device 12. If the network-based identification x corresponds to any of the registered network-based identification in the list List (step S108), the response unit 126' generates and outputs response information z by using the decryption key s read from the storage 121 and the input ciphertext C. The response information z is information by which the terminal device 11' obtains the decrypted value m' by the self-correction processing. For example, the output information disclosed in Reference literature 3 to 5 can be the response information z (step S110').

The response information z is input to the output unit 124'. The output unit 124' outputs the response information z (response information corresponding to the decrypted value) addressed to the terminal device 11', to the network corresponding to the network-based identification x (network-based identification corresponding to the registered network-based identification) (step S111'). The response information z is input to the input unit 114' in the terminal device 11' and is sent to the decryption processing unit 115' (step S112'). The decryption processing unit 115' performs self-correction processing using the response information z and obtains and outputs the decrypted value m' or error information indicating that the decrypted value m' cannot be obtained (step S113').

When the error information is obtained in step S113', the decryption processing can end in failure, or the processing of steps S101' to S113' can be executed again. Alternatively, when the decrypted value m' cannot be obtained by executing the processing of steps S101' to S113' a predetermined number of times, the decryption processing can end in failure. After it is determined that the network-based identification x corresponds to any of the registered network-based identification in the list List (step S108), the terminal device 11' can send the ciphertext C of this modification to the key device 12' (step S101"). When the error information is obtained in step S113', the processing of step S101" and steps S110' to S113' can be executed again. When the decrypted value m' cannot be obtained even by executing the processing of step S101" and steps S110' to S113' a predetermined number of times, the decryption processing can end in failure. If step S101" is executed, the ciphertext C does not have to be output in step S101'.

Examples 1 of Ciphertext C and Response Information z in this Modification

Examples of the ciphertext C and the response information z will now be given. In these examples, G and H are cyclic groups; $\mu_h$ is a generator of cyclic group H; the second ciphertext Enc(y, m) is an element of group H; f is a homomorphic decryption function for obtaining an element of group G by decrypting the second ciphertext Enc(y, m)∈H with the decryption key s; $X_1$ and $X_2$ are random variables having values in group G; $x_1$ is a realized value of random variable $X_1$; $x_2$ is a realized value of random variable $X_2$; r1 and r2 are random natural numbers greater than or equal to 0; and a and b are relatively-prime natural numbers. Either a or b can be a constant such as 1.

In step S101' or S101", the decryption processing unit 115' outputs $\tau_1 = \mu_h^{r1}\{Enc(y, m)\}^b$ and/or $\tau_2 = \mu_h^{r2}\{Enc(y, m)\}^a$ as the ciphertext C. In step S110', the response unit 126' outputs $z_1$ and/or $z_2$ as the response information z. Here, $z_1 = f(\tau_1)$ or $z_1 \neq f(\tau_1)$, and $z_2 = f(\tau_2)$ or $z_2 \neq f(\tau_2)$. In some cases, $z_1 = f(\tau_1)$ holds, and in some other cases, $z_1 = f(\tau_1)$ does not hold; in some cases, $z_2 = f(\tau_2)$ holds, and in some other cases, $z_2 = f(\tau_2)$ does not hold. That is, the response unit 126' calculates $f(\tau_1)$ correctly at a probability greater than a given probability and provides the obtained calculation result as $z_1$, and calculates $f(\tau_2)$ correctly at a probability greater than a given probability and provides the obtained calculation result as $z_2$. The given probability is a probability smaller than 100%. An example of the given probability is a probability that is not negligible, and an example of the probability that is not negligible is a probability not lower than $1/\psi(k)$, where the polynomial $\psi(k)$ is a monotonically non-decreasing function relative to security parameter k. That is, the response unit 126' outputs a calculation result containing an intentional or unintentional error. In step S113', the decryption processing unit 115' outputs $u^{b'}v^{a'}$ corresponding to $u = z_1 v^{-r1}$ and $v = z_2 v^{-r2}$ which satisfy $u^a = v^b$ as the decrypted value m'. Here, a' and b' are integers satisfying a'a+b'b=1. If $z_1$ and/or $z_2$ that satisfy $u^a = v^b$ are not obtained, the decryption processing unit 115' outputs error information indicating that the decrypted value m' cannot be obtained.

Examples 2 of Ciphertext C and Response Information z in this Modification

Examples of the ciphertext C and the response information z in this modification will be given below. In these examples, G is a cyclic group; group H is a direct product group G×G of group G; $\mu_g$ is a generator of cyclic group G; Enc(y, m)=$(c_1, c_2)$∈H; f is a homomorphic decryption function for obtaining an element of group G by decrypting the second ciphertext Enc(y, m)∈H with the decryption key s; $X_1$ and $X_2$ are random variables having values in group G; $x_1$ is a realized value of random variable $X_1$; $x_2$ is a realized value of random variable $X_2$; (V,W) is an element of group H; f(V,W)=Y; $r_4$ to $r_7$ are random natural numbers greater than or equal to 0; a and b are relatively-prime natural numbers. Either a or b can be a constant such as 1.

In step S101' or S101", the decryption processing unit 115' outputs $\tau_1 = (c_2^b W^{r4}, c_1^b V^{r4} \mu_g^{r5})$ and/or $\tau_2 = (c_2^a W^{r6}, c_1^a V^{r6} \mu_g^{r7})$ as the ciphertext C. In step S110', the response unit 126' outputs $z_1$ and/or $z_2$ as the response information z. Here, $z_1 = f(\tau_1)$ or $z_1 \neq f(\tau_1)$, and $z_2 = f(\tau_2)$ or $z_2 \neq f(\tau_2)$. In some cases, $z_1 = f(\tau_1)$ holds, and in some other cases, $z_1 = f(\tau_1)$ does not hold; in some cases, $z_2 = f(\tau_2)$ holds, and in some other cases, $z_2 = f(\tau_2)$ does not hold. In step S113', the decryption processing unit 115' outputs $u^{b'}v^{a'}$ corresponding to $u = z_1 Y^{-r4} \mu_g^{-r5}$ and $v = z_2 Y^{-r6} \mu_g^{-r7}$ which satisfy $u^a = v^b$ as the decrypted value m'. Here, a' and b' are integers satisfying a'a+b'b=1. If $z_1$ and/or $z_2$ which satisfy $u^a = v^b$ are not obtained, the decryption processing unit 115' outputs error information indicating that the decrypted value m' cannot be obtained.

Second Embodiment

A second embodiment of the present invention will now be described. The second embodiment is a modification of the first embodiment. In this embodiment, a key device stores a plurality of decryption keys; information for identifying a decryption key, ciphertext, and network-based identification is input to the key device; and when the network-based identification corresponds to registered network-based identification, the key device identifies a decryption key from the information for identifying the decryption key and decrypts the ciphertext. Generally, differences from the items explained above will be described below, and by using the same reference numerals for the items explained above, redundant explanation is avoided.

<Configuration>

Figure 3:
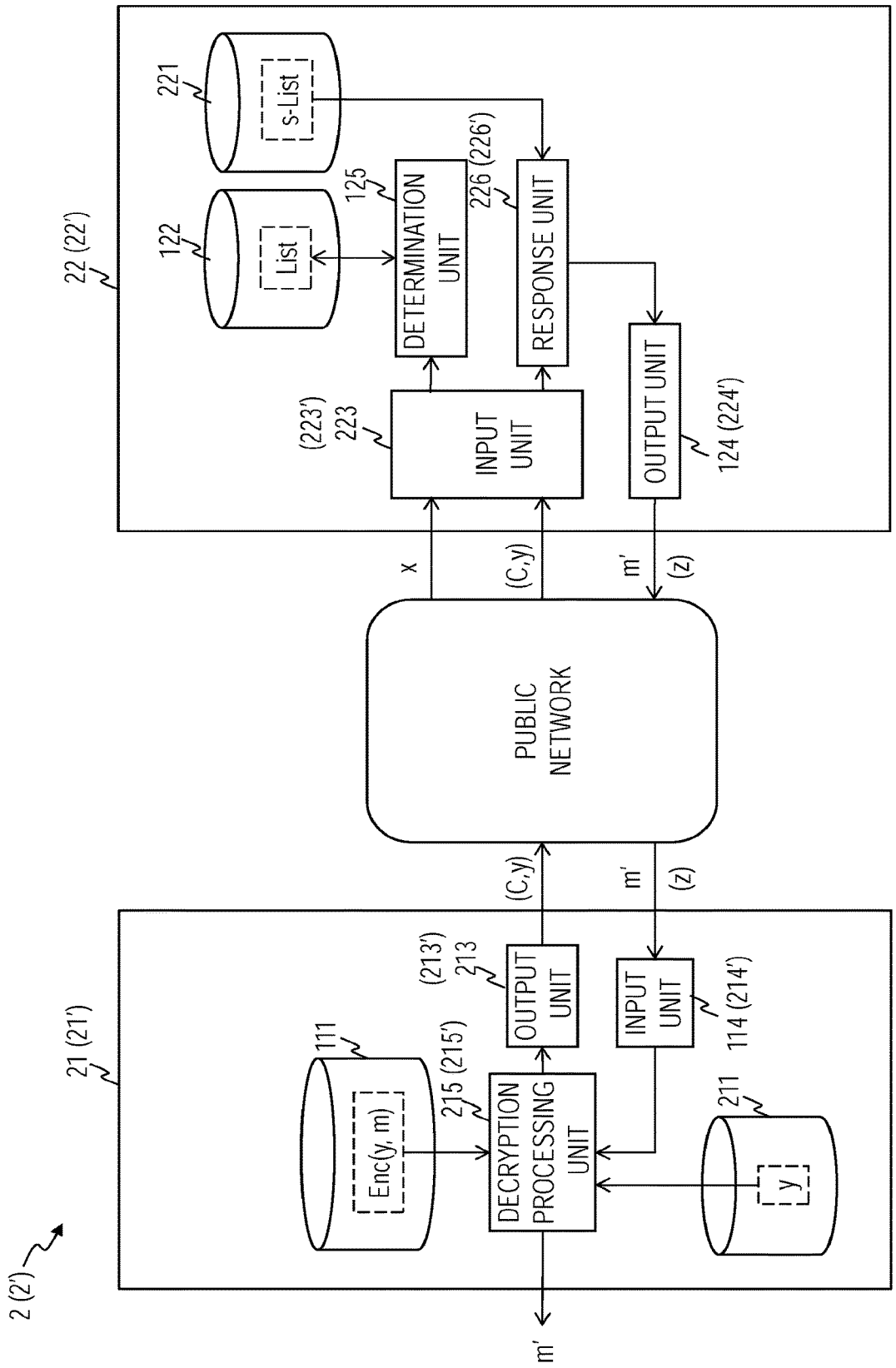
FIG. 3 is a block diagram showing the functional configurations of key cloud systems according to a second embodiment and a modification thereof.

The configuration of this embodiment will be described below. As shown in FIG. 3, a key cloud system 2 according to this embodiment includes a terminal device 21 and a key device 22. The terminal device 21 and the key device 22 are configured such that they can communicate through a public network having a network-based authentication function and a network-based identification notification function.

As shown in FIG. 3, the terminal device 21 in this embodiment includes the storage 111, a storage 211, an output unit 213, the input unit 114, and a decryption processing unit 215. The key device 22 includes a storage 221, the storage 122, an input unit 223, the output unit 124, the determination unit 125, and a response unit 226. The devices are configured by reading a predetermined program into the computer, for example. The information output from each processing unit is stored in a temporary memory, which is not shown in the figure, and is read and used for the processing in the processing unit when necessary. Although FIG. 3 shows one each of the terminal device 21 and the key device 22, two or more terminal devices or key devices can be present. In that case, the two or more terminal devices or key devices may be connected to a single network.

<Preconditions for Decryption Processing>

In this embodiment, different types of key pairs (y,s) of an encryption key y and a corresponding decryption key s are set up in advance. The different types of key pairs can be specified for a single encryption method, and the different types of key pairs can be specified for different types of encryption methods. A certain encryption key y is stored in an encryption apparatus, which is not shown in the figure, and a key list s-List formed of the specified different types of decryption keys s is stored securely in the storage 221 (key storage) of the key device 22. The encryption apparatus, not shown in the figure, generates ciphertext C=Enc(y, m) obtained by encrypting the plaintext m, using the certain encryption key y. The ciphertext C is stored in the storage 111 of the terminal device 21 (FIG. 3), and the encryption key y used to generate the ciphertext C is stored in the storage 211 of the terminal device 21. The other preconditions are the same as those in the first embodiment.

<Decryption Processing>

Figure 4:
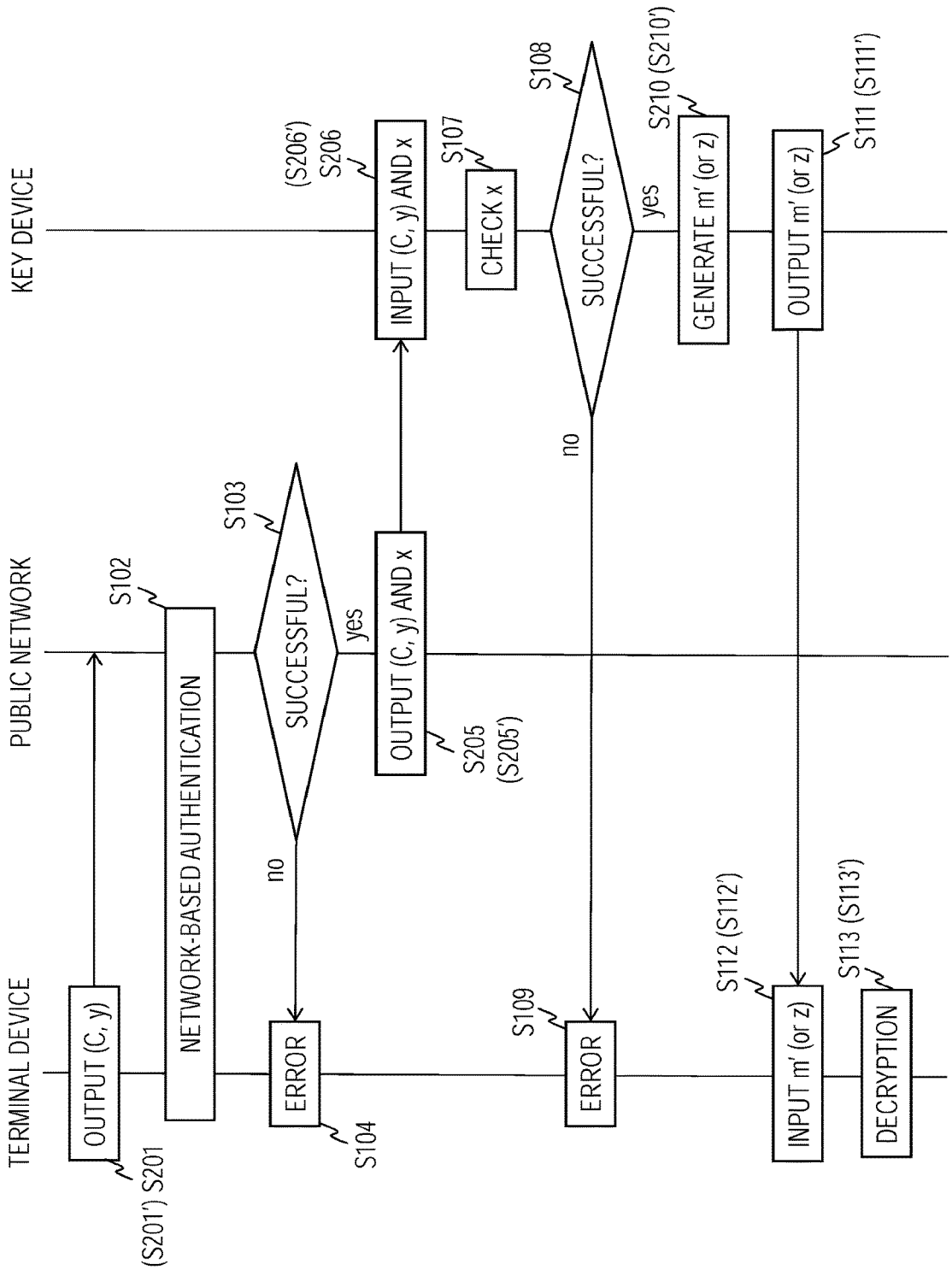
FIG. 4 is a sequence diagram illustrating decryption methods in the second embodiment and the modification thereof.

Decryption processing in this embodiment will be described with reference to FIG. 4. The decryption processing unit 215 in the terminal device 21 (FIG. 3) reads the ciphertext C from the storage 111, reads the encryption key y from the storage 211, and outputs the ciphertext C and the encryption key y (information for identifying the decryption key). The ciphertext C and the encryption key y are input to the output unit 213. The output unit 213 outputs the ciphertext C and the encryption key y addressed to the key device 22, to a predetermined network of the public networks (step S201).

Then, the processing proceeds to steps S102 to S104 described in the first embodiment. The processing, however, is performed by the terminal device 21, instead of the terminal device 11. If the network-based authentication succeeds (step S103), the ciphertext C and the encryption key y are sent to the key device 22, and further a notification apparatus (not shown in the figure), which provides the network-based identification notification function, sends network-based identification x to the key device 22 (step S205). The network-based identification x, the ciphertext C, and the encryption key y are input to the input unit 223 in the key device 22. The network-based identification x is sent to the determination unit 125, and the ciphertext C and encryption key y are sent to the response unit 226 (step S206). Then, the processing proceeds to steps S107 to S109 described in the first embodiment. The processing, however, is performed by the terminal device 21 and the key device 22, instead of the terminal device 11 and the key device 12.

If it is determined in step S107 that the network-based identification x corresponds to any of the registered network-based identification in the list List (step S108), the response unit 226 reads the decryption key s (decryption key identified by the information for identifying the decryption key) corresponding to the encryption key y by using the input encryption key y from the key list s-List stored in the storage 221 (key storage). The response unit 226 decrypts the ciphertext C, using the read decryption key s, and outputs a decrypted value m' thereby obtained (step S210). Then, the processing proceeds to steps S111 to S113 described in the first embodiment. The processing, however, is performed by the terminal device 21 and the key device 22, instead of the terminal device 11 and the key device 12.

Features of Second Embodiment

This embodiment also has the features of the first embodiment described above. In addition, ciphertext encrypted with any of the specified different types of encryption keys can be decrypted in this embodiment. Although an example of using a decryption key as information for identifying the decryption key is described in this embodiment, the information for identifying the decryption key can be information that uniquely identifies the decryption key (such as the key identifier of the decryption key), instead of the decryption key.

Modification of Second Embodiment

In a modification of the second embodiment, cloud-key-management-type decryption utilizing a self-correction technique can be performed. Generally, differences from the items explained above will be described below, and by using the same reference numerals for the items explained above, redundant explanation is avoided.

<Configuration>

The configuration of this modification will now be described. As shown in FIG. 3, a key cloud system 2' according to this modification includes a terminal device 21' and a key device 22'. The terminal device 21' and the key device 22' are configured such that they can communicate through a public network having a network-based authentication function and a network-based identification notification function.

As shown in FIG. 3, the terminal device 21' in this modification includes the storages 111 and 211, an output unit 213', an input unit 214', and a decryption processing unit 215'. The key device 22' includes the storages 221 and 122, an input unit 223', an output unit 224', the determination unit 125, and a response unit 226'. The devices are configured by reading a predetermined program into the computer, for example. The information output from each processing unit is stored in a temporary memory, which is not shown in the figure, and is read and used for the processing in the processing unit when necessary. Although FIG. 3 shows one each of the terminal device 21' and the key device 22', two or more terminal devices or key devices can be present. In that case, the two or more terminal devices or key devices may be connected to a single network.

<Preconditions for Decryption Processing>
Same as the second embodiment
<Decryption Processing>

Decryption processing in this modification will now be described with reference to FIG. 4. The decryption processing unit 215' in the terminal device 21' (FIG. 3) reads the second ciphertext Enc(y, m) from the storage 111, reads the encryption key y from the storage 211, and outputs information corresponding to the second ciphertext Enc(y, m), which is the ciphertext C and the encryption key y (information for identifying the decryption key). The ciphertext C in this modification is such information given to the key device 22' by the terminal device 21' that the terminal device 21' obtains from the key device 22' response information for obtaining a decrypted value m' of the ciphertext Enc(y, m) by self-correction processing. Examples of the ciphertext C are as shown in the modification of the first embodiment. The ciphertext C and the encryption key y are input to the output unit 213'. The output unit 213' outputs the ciphertext C and the encryption key y addressed to the key device 22', to a predetermined network of the public networks (step S201').

Then, the processing proceeds to steps S102 to S104 described in the first embodiment. The processing, however, is performed by the terminal device 21', instead of the terminal device 11. If the network-based authentication succeeds (step S103), the ciphertext C and the encryption key y are sent to the key device 22', and then, a notification apparatus (not shown in the figure), which provides the network-based identification notification function, sends network-based identification x to the key device 22' (step S205'). The network-based identification x, the ciphertext C, and the encryption key y are input to the input unit 223' in the key device 22'. The network-based identification x is sent to the determination unit 125, and the ciphertext C and the encryption key y are sent to the response unit 226' (step S206'). Then, the processing proceeds to steps S107 to S109 described in the first embodiment. The processing, however, is performed by the terminal device 21' and the key device 22', instead of the terminal device 11 and the key device 12.

If it is determined in step S107 that the network-based identification x corresponds to any of the registered network-based identification in the list List (step S108), the response unit 226' uses the input encryption key y to read from the key list s-List stored in the storage 221 (key storage) the decryption key s (decryption key identified by the information for identifying the decryption key) corresponding to the encryption key y. The response unit 226' uses the read decryption key s and the input ciphertext C to generate and output response information z. The response information z is information with which the terminal device 21' obtains a decrypted value m' by the self-correction processing. An example of the response information z is as indicated in the modification of the first embodiment (step S210').

Then, the processing proceeds to steps S111' to S113' described in the modification of the first embodiment. The processing, however, is performed by the terminal device 21' and the key device 22', instead of the terminal device 11' and the key device 12'. When error information is obtained in step S113', the decryption processing can end in failure, or the processing of steps S201' to S113' can be executed again. If the decrypted value m' cannot be obtained even after the processing of steps S201' to S113' is executed a predetermined number of times, the decryption processing can end in failure. After the network-based identification x is determined to correspond to any of the registered network-based identification in the list List (step S108), the terminal device 21' can send, to the key device 22', the ciphertext C of this modification (step S201"). If error information is obtained in step S113', the processing of step S201" and steps S210' to S113' can be executed again. If the decrypted value m' cannot be obtained even after the processing of step S201" and steps S210' to S113' is executed a predetermined number of times, the decryption processing can end in failure. If step S201" is executed, the ciphertext C does not have to be output in step S201'.

Third Embodiment

A third embodiment of the present invention will now be described. The third embodiment is a modification of the first embodiment. In this embodiment, a re-encryption key is further input to the key device, and the key device returns, as response information, information corresponding to re-encrypted text obtained by re-encrypting the decrypted value of the ciphertext with the re-encryption key. The re-encryption key is, for example, a random value obtained by the terminal device to which the response information is input, and the terminal device holds a re-encrypted-text decryption key for decrypting the re-encrypted text. The terminal device can obtain a decrypted value from the re-encrypted text by using the re-encrypted-text decryption key. Generally, differences from the items explained above will be described below, and by using the same reference numerals for the items explained above, redundant explanation is avoided.

<Configuration>

Figure 5:
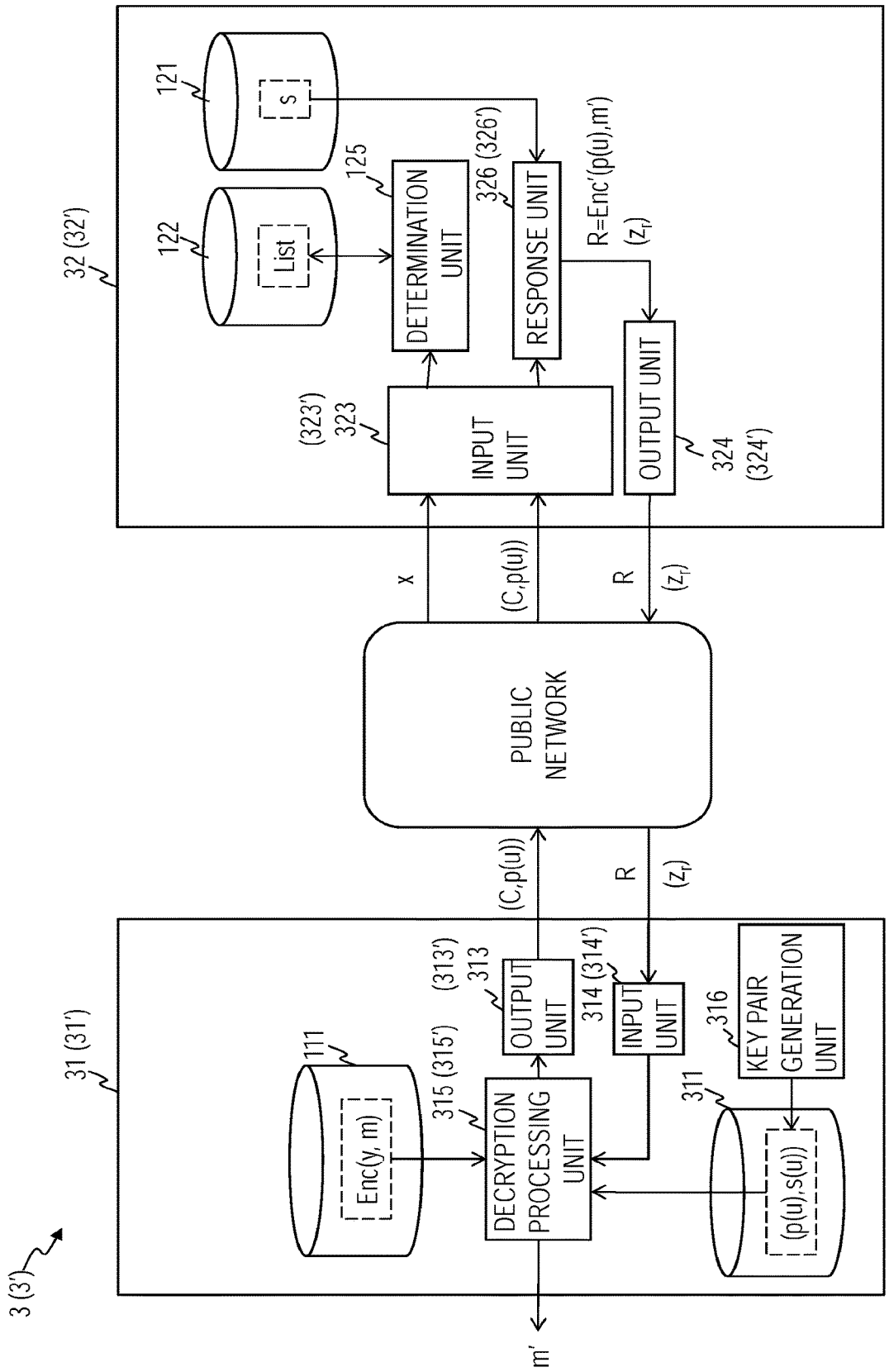
FIG. 5 is a block diagram showing the functional configurations of key cloud systems according to a third embodiment and a modification thereof.

A configuration of this embodiment will now be described. As shown in FIG. 5, a key cloud system 3 according to this embodiment includes a terminal device 31 and a key device 32. The terminal device 31 and the key device 32 are configured such that they can communicate through a public network having a network-based authentication function and a network-based identification notification function.

As shown in FIG. 5, the terminal device 31 in this embodiment includes the storage 111, a storage 311, an output unit 313, an input unit 314, and a decryption processing unit 315. The key device 32 includes the storages 121 and 122, an input unit 323, an output unit 324, the determination unit 125, and a response unit 326. The devices are configured by reading a predetermined program into the computer, for example. The information output from each processing unit is stored in a temporary memory, which is not shown in the figure, and is read and used for the processing in the processing unit when necessary. Although FIG. 5 shows one each of the terminal device 31 and the key device 32, two or more terminal devices or key devices can be present. In that case, the two or more terminal devices or key devices may be connected to a single network.

<Preconditions for Decryption Processing>
Same as in the first embodiment
<Decryption Processing>

Figure 6:
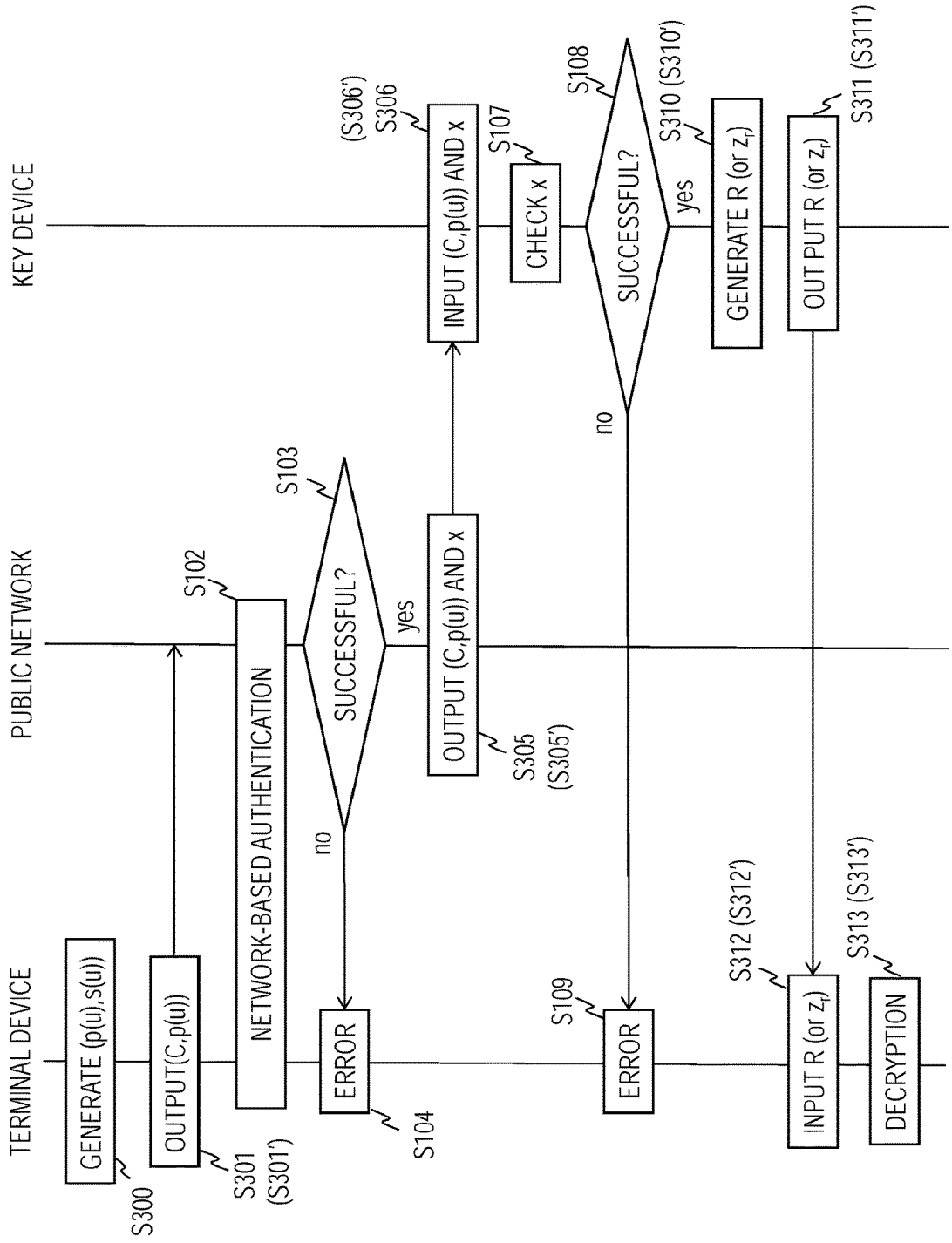
FIG. 6 is a sequence diagram illustrating decryption methods in the third embodiment and the modification thereof.

Decryption processing in this embodiment will now be described with reference to FIG. 6. First, a key pair generation unit 316 in the terminal device 31 (FIG. 5) generates a re-encryption key p(u) for re-encryption and a re-encrypted-text decryption key s(u) for decrypting the re-encrypted text which has been re-encrypted by using the re-encryption key p(u). For example, the key pair generation unit 316 generates pairs formed of a re-encryption key p(u) and a corresponding re-encrypted-text decryption key s(u) at random. The pair formed of the re-encryption key p(u) and the re-encrypted-text decryption key s(u) can be a key pair formed of a public key and a private key in the public-key encryption method, a pair formed of an identifier and a corresponding private key in the ID-based encryption method, a pair formed of an attribute vector and a corresponding private key in the function-type encryption method, or identical common keys in the common-key encryption method, for example. The pairs formed of the re-encryption key p(u) and the re-encrypted-text decryption key s(u) are stored (held) in the storage 311 (step S300).

The decryption processing unit 315 reads the ciphertext C from the storage 111, reads the re-encryption key p(u) from the storage 311, and outputs the ciphertext C and the re-encryption key p(u). The ciphertext C and the re-encryption key p(u) are input to the output unit 313. The output unit 313 outputs the ciphertext C and the re-encryption key p(u) addressed to the key device 32, to a predetermined network of the public networks (step S301).

Then, the processing proceeds to steps S102 to S104 described in the first embodiment. The processing, however, is performed by the terminal device 31, instead of the terminal device 11. If the network-based authentication succeeds (step S103), the ciphertext C and the re-encryption key p(u) are sent to the key device 32, and then, a notification apparatus (not shown in the figure), which provides the network-based identification notification function, sends network-based identification x to the key device 32 (step S305). The network-based identification x, the ciphertext C, and the re-encryption key p(u) are input to the input unit 323 in the key device 32. The network-based identification x is sent to the determination unit 125, and the ciphertext C and the re-encryption key p(u) are sent to the response unit 326 (step S306).

Then, the processing proceeds to steps S107 to S109 described in the first embodiment. The processing, however, is performed by the terminal device 31 and the key device 32, instead of the terminal device 11 and the key device 12. If it is determined that the network-based identification x corresponds to any of the registered network-based identification in the list List (step S108), the response unit 326 decrypts the ciphertext C, using the decryption key s stored in the storage 121 and thereby obtains a decrypted value m'. The response unit 326 further encrypts the decrypted value m', using the re-encryption key p(u), thereby obtaining re-encrypted text R=Enc'(p(u),m'), and outputs the re-encrypted text R. Here, Enc' is an encryption function for encrypting the decrypted value m' by using the re-encryption key p(u) and is a homomorphic function, for example (step S310). The re-encrypted text R is input to the output unit 324. The output unit 324 outputs the re-encrypted text R (response information corresponding to the decrypted value, in other words, response information corresponding to the re-encrypted text obtained by re-encrypting the decrypted value of the ciphertext with the re-encryption key) addressed to the terminal device 31, to the network corresponding to the network-based identification x (network-based identification corresponding to the registered network-based identification) (step S311).

The re-encrypted text R is input to the input unit 314 in the terminal device 31 and is sent to the decryption processing unit 315 (step S312). The decryption processing unit 315 reads the re-encrypted-text decryption key s(u) from the storage 311, decrypts the re-encrypted text R, using the re-encrypted-text decryption key s(u), outputs a decrypted value m'=Dec'(s(u),R) obtained thereby, and finishes the decryption processing. Here, Dec' is a decryption function for decrypting the re-encrypted text R by using the re-encrypted-text decryption key s(u) and is a homomorphic function, for example (step S313).

Features of Third Embodiment

This embodiment also has the features of the first embodiment described above. In addition, since the decrypted value obtained by the key device is re-encrypted and sent to the terminal device in this embodiment, leakage of the decrypted value to a third party can be reduced. Since the validity of the terminal device which has accessed the key device for connection, using the network in which network-based authentication has succeeded, is guaranteed, the validity of the re-encryption key is guaranteed, even without a certificate of the re-encryption key sent to the key device. If a pair formed of a re-encryption key and a re-encrypted-text decryption key is generated at random, there is no need to manage the re-encryption key and the re-encrypted-text decryption key in the key device.

The pair formed of the re-encryption key and the re-encrypted-text decryption key does not have to be generated at random. Although a pair formed of a re-encryption key and a re-encrypted-text decryption key is newly generated each time the decryption processing is performed in this embodiment, a pair of these keys can be generated at intervals of a predetermined number of times the decryption processing is performed, or a pair of these keys can be newly generated each time a predetermined period of time elapses. A pair of these keys does not have to be updated. If the re-encryption key is held in the key device and if the re-encrypted-text decryption key is held in the terminal device, the re-encryption key does not have to be sent from the terminal device to the key device.

Modification of Third Embodiment

In a modification of the third embodiment, cloud-key-management-type decryption utilizing the self-correction technique can be performed. Generally, differences from the items explained above will be described below, and by using the same reference numerals for the items explained above, redundant explanation is avoided.

<Configuration>

The configuration of this modification will now be described. As shown in FIG. 5, a key cloud system 3' according to this modification includes a terminal device 31' and a key device 32'. The terminal device 31' and the key device 32' are configured such that they can communicate through a public network having a network-based authentication function and a network-based identification notification function.

As shown in FIG. 5, the terminal device 31' in this modification includes the storages 111 and 311, an output unit 313', an input unit 314', and a decryption processing unit 315'. The key device 32' includes the storages 121 and 122, an input unit 323', an output unit 324', the determination unit 125, and a response unit 326'. The devices are configured by reading the program, for example. The information output from each processing unit is stored in a temporary memory, which is not shown in the figure, and is read and used for the processing in the processing unit when necessary. Although FIG. 5 shows one each of the terminal device 31' and the key device 32', two or more terminal devices or key devices can be present. In that case, the two or more terminal devices or key devices may be connected to a single network.

<Preconditions for Decryption Processing>
Same as in the first embodiment
<Decryption Processing>

Decryption processing in this modification will now be described with reference to FIG. 6. First, instead of the terminal device 31, the terminal device 31' performs the processing of step S300 described in the third embodiment. Next, the decryption processing unit 315' reads the second ciphertext Enc(y, m) from the storage 111, reads a re-encryption key p(u) from the storage 311, and outputs information corresponding to the second ciphertext Enc(y, m), which is the ciphertext C and the re-encryption key p(u). The ciphertext C in this modification is such information given to the key device 32' by the terminal device 31' that the terminal device 31' obtains from the key device 32' response information for obtaining re-encrypted text R=Enc'(p(u),m') by the self-correction processing. The re-encrypted text R is obtained by re-encrypting the decrypted value m' of the ciphertext Enc(y, m) with the re-encryption key p(u). An example of the ciphertext C is as indicated in the modification of the first embodiment (step S301').

Then, the processing proceeds to steps S102 to S104 described in the first embodiment. The processing, however, is performed by the terminal device 31', instead of the terminal device 11. If the network-based authentication succeeds (step S103), the ciphertext C and the re-encryption key p(u) are sent to the key device 32', and then, a notification apparatus (not shown in the figure), which provides the network-based identification notification function, sends network-based identification x to the key device 32' (step S305'). The network-based identification x, the ciphertext C, and the re-encryption key p(u) are input to the input unit 323' in the key device 32'. The network-based identification x is sent to the determination unit 125, and the ciphertext C and the re-encryption key p(u) are sent to the response unit 326' (step S306').

Then, the processing proceeds to steps S107 to S109 described in the first embodiment. The processing, however, is performed by the terminal device 31' and the key device 32', instead of the terminal device 11 and the key device 12. If the network-based identification x corresponds to any of the registered network-based identification in the list List (step S108), the response unit 326' uses the decryption key s read from the storage 121, the input ciphertext C, and the re-encryption key p(u) to generate and output response information z. The response information z is information by which the terminal device 31' obtains re-encrypted text R=Enc'(p(u),m') through the self-correction processing. An example of the response information z is as indicated in the modification of the first embodiment, except that f is a homomorphic function for re-encrypting, with the re-encryption key p(u), the decrypted value m' obtained by decrypting the second ciphertext Enc(y, m) with the decryption key s (step S310').

The response information z is input to the output unit 324'. The output unit 324' outputs the response information z (response information corresponding to the decrypted value) addressed to the terminal device 31', to the network corresponding to the network-based identification x (network-based identification corresponding to the registered network-based identification) (step S311'). The response information z is input to the input unit 314' in the terminal device 31' and is sent to the decryption processing unit 315' (step S312'). The decryption processing unit 315' performs self-correction processing utilizing the response information z and obtains re-encrypted text R or error information indicating that re-encrypted text R cannot be obtained. When the re-encrypted text R is obtained, the decryption processing unit 315' reads the re-encrypted-text decryption key s(u) from the storage 311, decrypts the re-encrypted text R, using the re-encrypted-text decryption key s(u), and outputs a decrypted value m' obtained thereby. When the error information is obtained, the decryption processing unit 315' outputs the error information (step S313').

If the error information is obtained in step S313', the decryption processing can end in failure, or the processing of steps S300 to S313' can be executed again. Alternatively, the decryption processing can end in failure if the decrypted value m' cannot be obtained even after the processing of steps S300 to S313' is executed a predetermined number of times. Alternatively, after it is determined that the network-based identification x corresponds to any of the registered network-based identification in the list List (step S108), the terminal device 31' can send the ciphertext C of this modification to the key device 32' (step S301"). If the error information is obtained in step S313', the processing of step S301" and steps S310' to S313' can be executed again. If the decrypted value m' cannot be obtained by executing the processing of step S301" and steps S310' to S313' a predetermined number of times, the decryption processing can end in failure. If step S301" is executed, the ciphertext C does not have to be output in step S301'.

Fourth Embodiment

A fourth embodiment of the present invention will now be described. The fourth embodiment is a modification of the first embodiment. In this embodiment, the registered network-based identification is hierarchical network-based identification; the registered network-based identification is information corresponding to any of the hierarchical network-based identification; the ciphertext has been encrypted in the hierarchical ID-based encryption method; and the decrypted value is a value obtained by decrypting the ciphertext with a decryption key corresponding to an identifier that includes the network-based identification. Generally, differences from the items explained above will be described below, and by using the same reference numerals for the items explained above, redundant explanation is avoided.

<Hierarchical Network-Based Identification>

A hierarchical network-based identification means a hierarchical network-based identification having a tree structure. Hierarchical network-based identification $x_\beta$ (here, $\alpha$ and $\beta$ are positive integers) belonging to a level below hierarchical network-based identification $x_\alpha$ is information formed by adding some information to the hierarchical network-based identification $x_\alpha$. In other words, the hierarchical network-based identification $x_\beta$ includes all pieces of hierarchical network-based identification $x_\alpha$ belonging to the upper level. That is, hierarchical network-based identification $x_\alpha$ belonging to a level above the hierarchical network-based identification $x_\beta$ includes part of the hierarchical network-based identification $x_\beta$. Examples of the hierarchical network-based identification $x_\beta$ include an email address and a department name. In this embodiment, the hierarchical network-based identification $x_\alpha$ is denoted by a tuple $x_\alpha=(\chi_1, \ldots, \chi_\alpha)$ including elements $\chi_1, \ldots, \chi_\alpha$. For example, if the hierarchical network-based identification $x_\alpha$ is ntt.co.jp, $x_\alpha=(jp,co,ntt)$ is given. If $\chi_1=\chi_1', \ldots,$ and $\chi_\alpha=\chi_\alpha'$ (here, $\alpha<\beta$) are satisfied with respect to $x_\alpha=(\chi_1, \ldots, \chi_\alpha)$ and $x_\beta=(\chi_1', \ldots, \chi_\alpha', \ldots, \chi_\beta')$, $x_\alpha$ belongs to a level above $x_\beta$, and $x_\beta$ belongs to a level below $x_\alpha$. This is written as $\lfloor x_\alpha \rfloor > \lfloor x_\beta \rfloor$. For example, $x_\alpha=(jp,co,ntt)$ representing ntt.co.jp belongs to a level above $x_\beta$=(jp,co,ntt,lab) representing lab.ntt.co.jp, and this is written as $\lfloor x_\alpha \rfloor > \lfloor x_\beta \rfloor$. The fact that hierarchical network-based identification $x_\alpha = (\chi_1, \ldots, \chi_\alpha)$ and $x_\alpha' = (\chi_1', \ldots, \chi_\alpha')$ satisfy $\chi_1 = \chi_1', \ldots,$ and $\chi_\alpha = \chi_\alpha'$ is written as $\lfloor x_\alpha \rfloor = \lfloor x_\alpha' \rfloor$. The fact that either $[x_\alpha] > [x_\beta]$ or $[x_\alpha] = [x_\beta]$ is satisfied is written as $[x_\alpha] \geq [x_\beta]$.

<Hierarchical ID-Based Encryption Method>

A hierarchical ID-based encryption method is a type of ID-based encryption method and uses hierarchical information having a tree structure as an identifier. In the hierarchical ID-based encryption method, someone who knows the private key corresponding to an identifier belonging to a higher level is allowed to decrypt ciphertext encrypted with an identifier belonging to a level below. The hierarchical ID-based encryption method itself is known and is described in detail in Reference literature 6 (Boneh, Boyen, Goh, "Hierarchical Identity Based Encryption with Constant Size Ciphertext," Advances in Cryptology-EUROCRYPT 2005, LNCS 3494, pages 440-456, Springer, 2005) and Reference literature 7 (Japanese Patent Application Laid Open No. 2010-154193), for example.

<Hierarchical ID-Based Encryption Method Using Hierarchical Network-Based Identification as Identifier>

The hierarchical ID-based encryption method can be configured by using the hierarchical network-based identification as an identifier. This type of hierarchical ID-based encryption method is defined by functions setup, keygen, enc, and dec described below.

Function setup receives $1^\lambda$ and outputs parameter params and master private key master key∈KEY. Here, λ is a security parameter, which is a positive integer, params includes information representing a plaintext space, information representing a ciphertext space, and information representing a key space KEY.

Function keygen receives parameter params, identifier $x_\beta$, which is a hierarchical network-based identification or information belonging to a lower level, and private key $s_\alpha$∈KEY corresponding to the hierarchical network-based identification $x_\alpha$ belonging to a level above the identifier $x_\beta$, and outputs private key $s_\beta$∈KEY corresponding to the hierarchical network-based identification $x_\beta$. Here, the private key sp can also be obtained from parameter params, master private key master key, and identifier $x_\beta$.

Function enc receives parameter params, plaintext m, and hierarchical network-based identification $x_\alpha$ and outputs ciphertext C=enc($x_\alpha$, m) obtained by encrypting plaintext m by the hierarchical ID-based encryption method, using the hierarchical network-based identification $x_\alpha$ as an identifier. Here, enc is an encryption function of the hierarchical ID-based encryption method.

Function dec receives parameter params, ciphertext C, and private key $s_\alpha$ and outputs a decrypted value m' dec($s_\alpha$, C) obtained by decrypting the ciphertext C by the hierarchical ID-based encryption method, using the private key $s_\alpha$. Here, dec is a decryption function of the hierarchical ID-based encryption method.

<Configuration>

Figure 7:
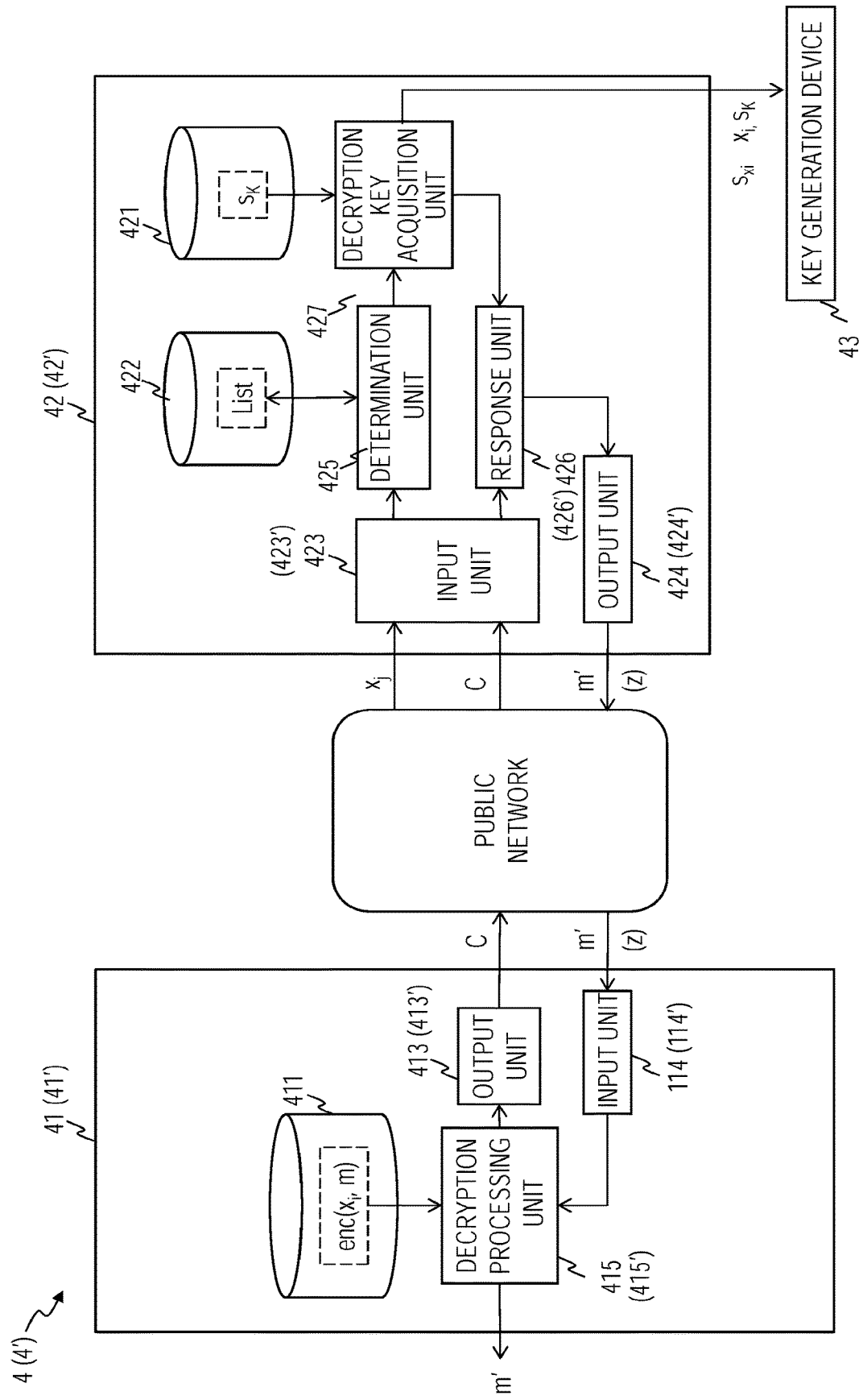
FIG. 7 is a block diagram showing the functional configurations of key cloud systems according to a fourth embodiment and a modification thereof.

The configuration of this embodiment will now be described. As shown in FIG. 7, a key cloud system 4 according to this embodiment includes a terminal device 41, a key device 42, and a key generation device 43. The terminal device 41 and the key device 42 are configured such that they can communicate through a public network having a network-based authentication function and a network-based identification notification function. The key device 42 and the key generation device 43 are configured such that they can communicate with each other.

As shown in FIG. 7, the terminal device 41 in this embodiment includes a storage 411, an output unit 413, the input unit 114, and a decryption processing unit 415. The key device 42 includes storages 421 and 422, an input unit 423, an output unit 424, a determination unit 425, a response unit 426, and a decryption key acquisition unit 427. The devices are configured by reading a predetermined program into the computer, for example. The information output from each processing unit is stored in a temporary memory, which is not shown in the figure, and is read and used for the processing in the processing unit when necessary. Although FIG. 7 shows one each of the terminal device 41, the key device 42, and the key generation device 43, two or more terminal devices, key devices, or key generation devices can be present. In that case, the two or more terminal devices or key devices may be connected to a single network.

<Preconditions for Decryption Processing>

In this embodiment, individual networks in the public networks are hierarchical, and pieces of network-based identification corresponding to the individual networks are hierarchical network-based identification. For example, the hierarchical networks are allocated to the individual levels of an organization or the like, and pieces of network-based identification corresponding to the networks used in the individual levels are hierarchical network-based identification. Parameter params and master private key master key described above are set in the key generation device 43, and parameter params is set in the decryption processing unit 415 in the terminal device 41 and the response unit 426 in the key device 42. Certain hierarchical network-based identification or information at a higher level is set as identifier K, and private key $s_K$ corresponding to identifier K is stored as a decryption key in the storage 421 (key storage) of the key device 42. For example, identifier K is information in a level above the hierarchical network-based identification corresponding to the network used by the administrator or the hierarchical network-based identification corresponding to the network managed by the administrator. Hierarchical network-based identification $x_j$ of the network used by the terminal device 41 or information in a level below is set as identifier $x_i$ (here, i and j are positive integers), and ciphertext C=enc($x_i$, m) obtained by encrypting plaintext m by using function enc is stored in the storage 411 of the terminal device 41.

Networks in which a decryption service is permitted are set up beforehand, and a list List of registered network-based identification (registered network-based identification corresponding to any of hierarchical network-based identification) corresponding to any of the networks in which the decryption service is permitted is stored in the storage 422 (registered-network storage) of the key device 42. The registered network-based identification can be hierarchical network-based identification itself with which the decryption service is permitted or can be information uniquely defined for the hierarchical network-based identification with which the decryption service is permitted.

<Decryption Processing>

Figure 8:
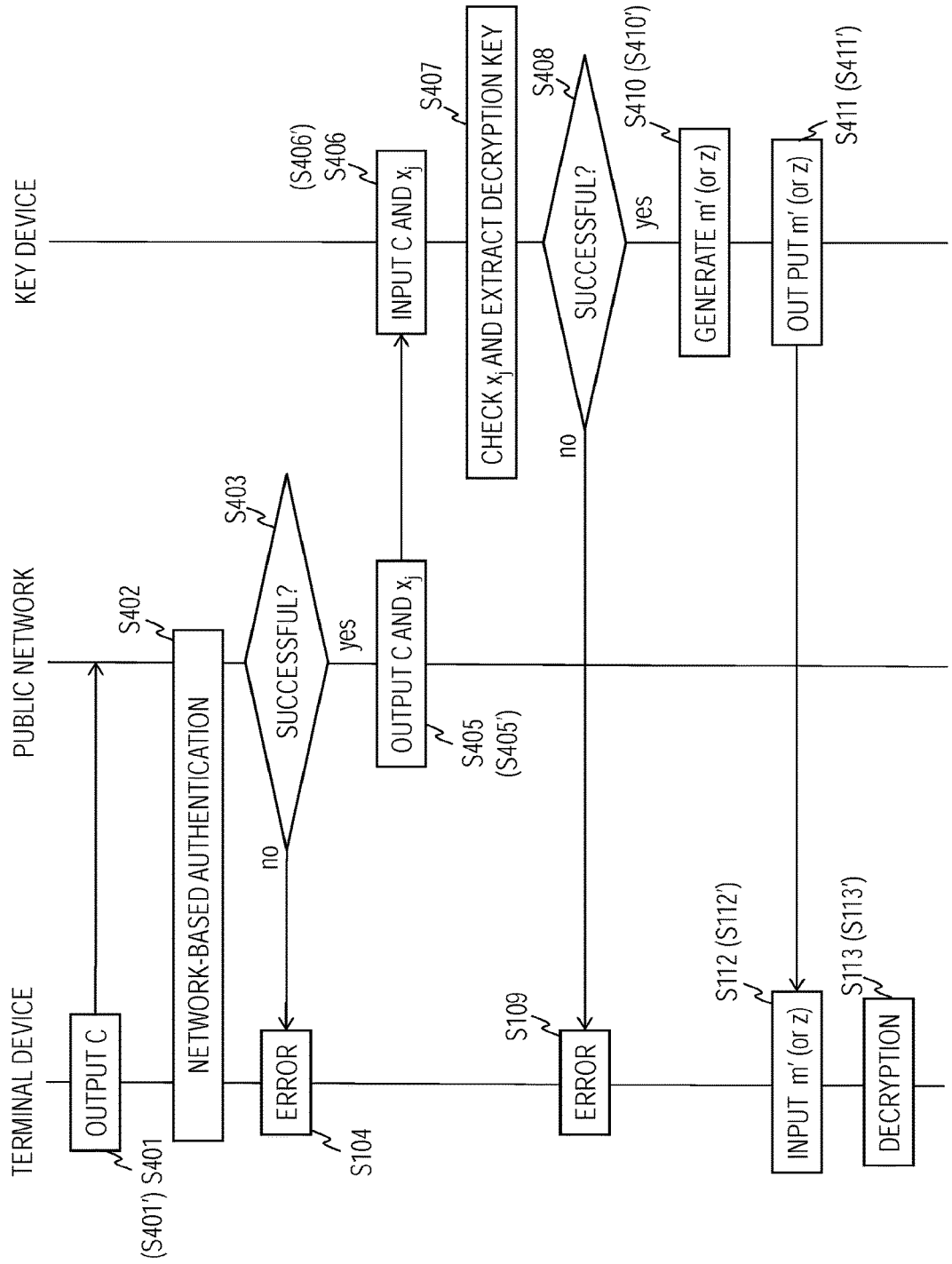
FIG. 8 is a sequence diagram illustrating decryption methods in the fourth embodiment and the modification thereof.

Decryption processing in this embodiment will now be described with reference to FIG. 8. The decryption processing unit 415 in the terminal device 41 (FIG. 7) reads the ciphertext C from the storage 411 and outputs the ciphertext C. The ciphertext C is input to the output unit 413. The output unit 413 outputs the ciphertext C addressed to the key device 42, to a predetermined network of the public networks (step S401).

The hierarchical network-based identification $x_j$ of the network to which the ciphertext C is output is sent to an authentication apparatus (not shown in the figure), which provides the network-based authentication function, and the authentication apparatus performs network-based authentication, using the hierarchical network-based identification $x_j$ (step S402). If the network-based authentication fails (step S403), error information is sent to the terminal device 41. The sent error information is input to the input unit 114 and is sent to the decryption processing unit 415, and then, the decryption processing unit 415 finishes the decryption processing (step S104).

If the network-based authentication succeeds (step S403), the ciphertext C is sent to the key device 42, and then, a notification apparatus (not shown in the figure), which provides the network-based identification notification function, sends the hierarchical network-based identification $x_j$ to the key device 42 (step S405). The hierarchical network-based identification $x_j$ and the ciphertext C are input to the input unit 423 in the key device 42. The hierarchical network-based identification $x_j$ input to the input unit 423 is information corresponding to the network where the network-based authentication has succeeded. The hierarchical network-based identification $x_j$ is sent to the determination unit 425, and the ciphertext C is sent to the response unit 426 (step S406).

The determination unit 425 determines whether the hierarchical network-based identification $x_j$ corresponds to any of the registered network-based identification in the list List stored in the storage 422. For example, if the registered network-based identification is hierarchical network-based identification itself, it is determined whether the hierarchical network-based identification $x_j$ corresponds to any of the registered network-based identification in the list List, by determining whether the list List includes the hierarchical network-based identification $x_j$. Alternatively, by determining whether the hierarchical network-based identification $x_j$ includes hierarchical network-based identification corresponding to any of the registered network-based identification in the list List, it can be determined whether the hierarchical network-based identification $x_j$ corresponds to any of the registered network-based identification in the list List. That is, the fact that the hierarchical network-based identification $x_j$ corresponds to any of the registered network-based identification in the list List can indicate that the hierarchical network-based identification $x_j$ includes the hierarchical network-based identification corresponding to the registered network-based identification. In other words, the fact that the hierarchical network-based identification $x_j$ corresponds to any of the registered network-based identification in the list List can indicate that the hierarchical network-based identification $x_j$ belongs to a level lower than the hierarchical network-based identification corresponding to any of the registered network-based identification in the list List or the hierarchical network-based identification corresponding to the registered network-based identification.

If the hierarchical network-based identification $x_j$ corresponds to any of the registered network-based identification in the list List (if the decryption authority authentication succeeds), the decryption key acquisition unit 427 extracts private key $s_{xi}$ corresponding to the identifier $x_i$ as a decryption key. The subscript xi represents $x_i$. Here, $x_i$ represents information $x_j$ or information in a level below, so the information $x_i$ includes $x_j$. That is, the decryption key acquisition unit 427 extracts the private key $s_{xi}$ corresponding to the identifier $x_i$ that includes the hierarchical network-based identification $x_j$ as a decryption key. Here, the decryption key acquisition unit 427 is required to identify the identifier $x_i$, so that the decryption key acquisition unit 427 can extract the private key $s_{xi}$. If $\lfloor x_i \rfloor = \lfloor x_j \rfloor$, the decryption key acquisition unit 427 can identify the identifier $x_i = x_j$ from the hierarchical network-based identification $x_j$. On the other hand, if $\lfloor x_i \rfloor < \lfloor x_j \rfloor$, the decryption key acquisition unit 427 cannot identify identifier $x_i$ just from the hierarchical network-based identification $x_j$. Even in that case, if the difference between $x_j$ and $x_i$, which is element y, is a constant or public information, the determination unit 425 can identify $x_i$ as $x_i = (x_j, \chi)$. Alternatively, by sending the ciphertext C and $x_i$ from the terminal device 41 to the key device 42, the determination unit 425 can identify $x_i$. Alternatively, if the identifier $x_i$ is public information, the decryption key acquisition unit 427 can acquire the public identifier $x_i$ and identify $x_i$ (step S407). On the other hand, if the hierarchical network-based identification $x_j$ does not correspond to any of the registered network-based identification in the list List (if the decryption authority authentication fails), the decryption key acquisition unit 427 does not extract a decryption key.

<<Details of Step S407>>

Figure 9:
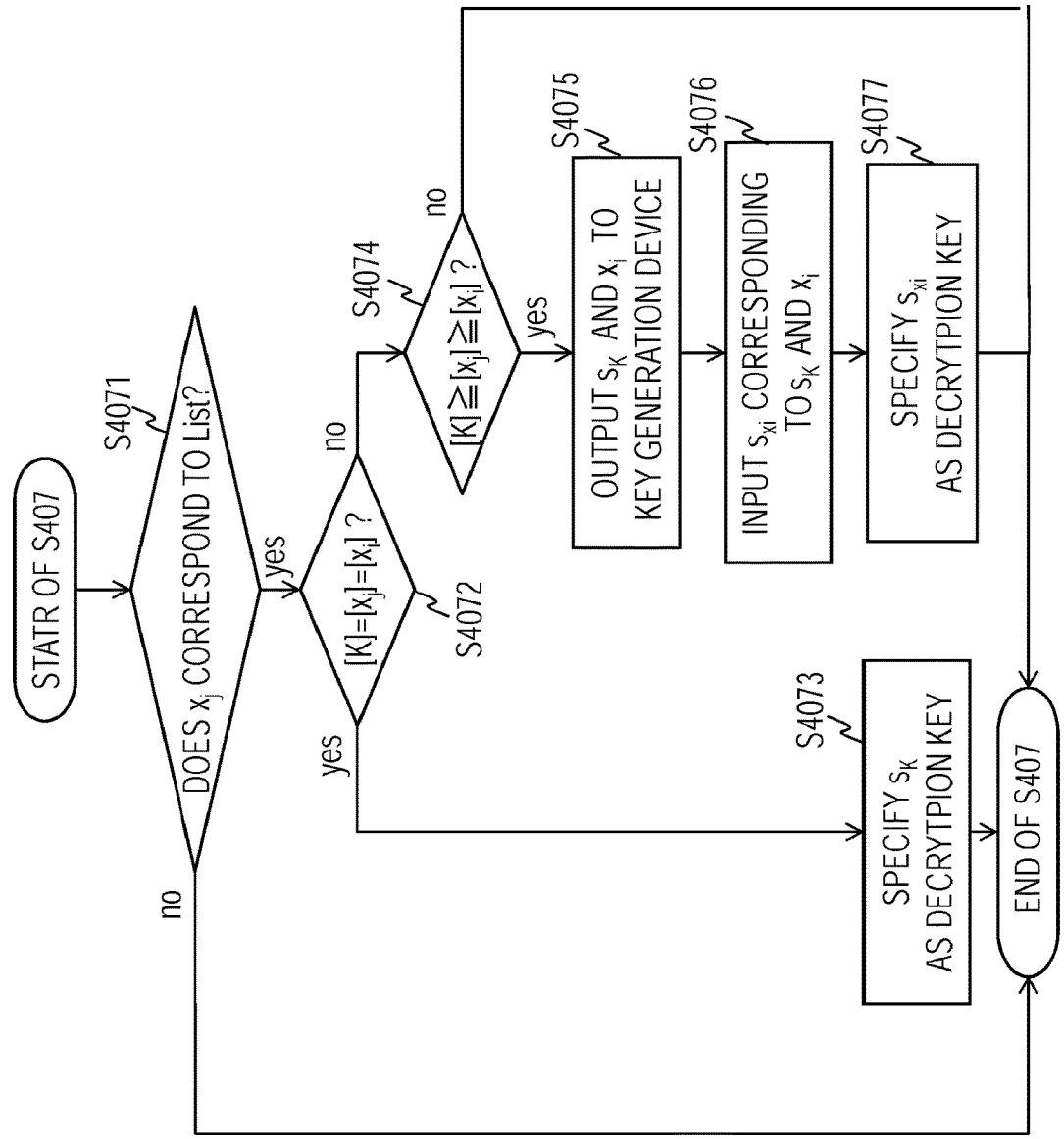
FIG. 9 is a flowchart illustrating a detailed example of step S407.

An example of step S407 will now be described in detail with reference to FIG. 9

The determination unit 425 determines whether the hierarchical network-based identification $x_j$ corresponds to any of the registered network-based identification in the list List (for example, whether the list List includes the hierarchical network-based identification $x_j$) (step S4071). If it is determined that the hierarchical network-based identification $x_j$ does not correspond to any registered network-based identification in the list List, the decryption authority authentication fails, and the processing of step S407 ends.

If it is determined in step S4071 that the hierarchical network-based identification $x_j$ corresponds to any of the registered network-based identification in the list List, the determination unit 425 determines whether identifier K corresponding to the private key $S_K$ stored in the storage 421, the hierarchical network-based identification $x_j$, and the identifier $x_i$ satisfy $\lfloor K \rfloor = \lfloor x_j \rfloor = \lfloor x_i \rfloor$. In other words, the determination unit 425 determines whether K, $x_j$, and $x_i$ are equal to one another (step S4072). If it is determined that $\lfloor K \rfloor \lfloor x_j \rfloor = \lfloor x_i \rfloor$ is satisfied, the decryption key acquisition unit 427 reads the private key $s_K$ from the storage 421, thereby setting the decryption key $s_{xi} = s_K$, and finishes the processing of step S407, considering that the decryption authority authentication has succeeded (step S4073).

If it is determined in step S4072 that $\lfloor K \rfloor = \lfloor x_j \rfloor = \lfloor x_i \rfloor$ is not satisfied, the determination unit 425 determines whether $\lfloor K \rfloor \geq \lfloor x_j \rfloor \geq \lfloor x_i \rfloor$ is satisfied. In other words, the determination unit 425 determines whether K belongs to a level above $x_j$ or whether K=$x_j$ and also determines whether $x_j$ belongs to a level above $x_i$ or whether $x_j = x_i$ (step S4074). If it is determined that $\lfloor K \rfloor \geq \lfloor x_j \rfloor \geq \lfloor x_i \rfloor$ is not satisfied, it is considered that the decryption authority authentication has failed, and the processing of step S407 ends.

If it is determined in step S4074 that $\lfloor K \rfloor \geq \lfloor x_j \rfloor \geq \lfloor x_i \rfloor$ is satisfied, the decryption key acquisition unit 427 outputs the input identifier $x_i$ and the private key $s_K$ read from the storage 421, to the key generation device 43 (step S4075). The key generation device 43 uses parameter params, the input identifier $x_i$, and the private key $S_K$, and generates and outputs the private key $s_{xi}$ corresponding to the identifier $x_i$ by function keygen. The private key $s_{xi}$ is input to the decryption key acquisition unit 427 (step S4076). The decryption key acquisition unit 427 sets the input private key $s_{xi}$ as the decryption key and finishes the processing of step S407, considering that the decryption authority authentication has succeeded (step S4077) (end of the description of <<Details of step S407>>).

If the decryption authority authentication fails in step S407 (step S408), the output unit 424 sends error information. The sent error information is input to the input unit 114 in the terminal device 41 and is sent to the decryption processing unit 415, and then, the decryption processing unit 415 finishes the decryption processing (step S109). On the other hand, if the decryption authority authentication succeeds in step S407 (step S408), the response unit 426 decrypts the ciphertext C, using the extracted decryption key $s_{xi}$ and outputs a decrypted value m' thereby obtained (step S410). The decrypted value m' is input to the output unit 424. The output unit 424 outputs the decrypted value m' (response information corresponding to the decrypted value) addressed to the terminal device 41, to a network corresponding to the hierarchical network-based identification $x_j$ (network-based identification corresponding to the registered network-based identification) (step S411). Then, the processing proceeds to steps S112 and S113 described in the first embodiment. The processing, however, is performed by the terminal device 41, instead of the terminal device 11.

Features of Fourth Embodiment

This embodiment also has the features of the first embodiment described above. In addition, the network-based identification is hierarchical network-based identification; the registered network-based identification is information corresponding to any of the hierarchical network-based identification; the ciphertext to be decrypted has been obtained by encryption in the hierarchical ID-based encryption method; and a decrypted value is obtained by decrypting the ciphertext with the decryption key corresponding to an identifier that includes the network-based identification, in this embodiment. This makes it possible to manage decryption authorities in association with the hierarchical structure of networks. For example, if a decryption authority is given in step S407 when the network-based identification corresponding to the network to be used belongs to a level below the hierarchical network-based identification corresponding to the registered network-based identification, it can be determined, by performing the determination of step S407 on the hierarchical network-based identification at a higher level, whether networks corresponding to all the pieces of the network-based identification belonging to a lower level have decryption authorities. This makes it possible to simplify the determination processing in comparison with when the presence or absence of decryption authority is determined for each network-based identification, and furthermore, the data amount of registered network-based identification to be managed by the key device can be reduced. In addition, since the decryption authorities can be managed hierarchically, human error in the setting of the key device, such as a wrong setting of the registered network-based identification and a setting failure, can be reduced.

Modification of Fourth Embodiment

In a modification of the fourth embodiment, cloud-key-management-type decryption using the self-correction technique can be performed. Generally, differences from the items explained above will be described below, and by using the same reference numerals for the items explained above, redundant explanation is avoided.

<Configuration>

The configuration of this modification will now be described. As shown in FIG. 7, a key cloud system 4' according to this modification includes a terminal device 41' and a key device 42'. The terminal device 41' and the key device 42' are configured such that they can communicate through a public network having a network-based authentication function and a network-based identification notification function.

As shown in FIG. 7, the terminal device 41' in this modification includes the storage 411, an output unit 413', an input unit 414', and a decryption processing unit 415'. The key device 42' includes the storages 421 and 422, an input unit 423', an output unit 424', the determination unit 425, and a response unit 426'. The devices are configured by reading the program, for example. The information output from each processing unit is stored in a temporary memory, which is not shown in the figure, and is read and used for the processing in the processing unit when necessary. Although FIG. 7 shows one each of the terminal device 41', the key device 42', and a key generation device 43, two or more terminal devices, key devices, or key generation devices can be present. In that case, the two or more terminal devices or key devices may be connected to a single network.

<Preconditions for Decryption Processing>

Same as in the fourth embodiment

<Decryption Processing>

Decryption processing in this modification will now be described with reference to FIG. 8. The decryption processing unit 415' in the terminal device 41' (FIG. 7) reads second ciphertext enc($x_i$, m) from the storage 411 and outputs information corresponding to the second ciphertext enc($x_i$, m) as ciphertext C. The ciphertext C in this modification is such information given to the key device 42' by the terminal device 41' that the terminal device 41' obtains from the key device 42' response information for obtaining a decrypted value m' of the ciphertext enc($x_i$, m) by the self-correction processing. An example of the ciphertext C is ciphertext C obtained by replacing Enc(y, m) with enc($x_i$, m) in the modification of the first embodiment (step S401').

Then, the processing proceeds to steps S402, S403, and S104 described in the first or fourth embodiment. The processing, however, is performed by the terminal device 41', instead of the terminal device 11 or 41. If the network-based authentication succeeds (step S403), the ciphertext C is sent to the key device 42', and then, a notification apparatus (not shown in the figure), which provides the network-based identification notification function, sends hierarchical network-based identification $x_j$ to the key device 42' (step S405'). The hierarchical network-based identification $x_j$ and the ciphertext C are input to the input unit 423' in the key device 42'. The hierarchical network-based identification $x_j$ is sent to the determination unit 425, and the ciphertext C is sent to the response unit 426' (step S406').

Then, the processing proceeds to steps S407, S408, and S109 described in the first of fourth embodiment. The processing, however, is performed by the terminal device 41' and the key device 42', instead of the terminal device 11 or 41 and the key device 12 or 42. If the decryption authority authentication succeeds in step S407 (step S408), the response unit 426' uses the extracted decryption key $s_{xi}$ and the input ciphertext C to generate and output response information z. The response information z is information with which the terminal device 41' obtains a decrypted value m' by the self-correction processing. An example of the response information z is the response information z obtained by replacing Enc(y, m) with enc($x_j$, m) in the modification of the first embodiment (step S410').

The response information z is input to the output unit 424'. The output unit 424' outputs the response information z (response information corresponding to the decrypted value) addressed to the terminal device 41', to a network corresponding to the hierarchical network-based identification $x_j$ (network-based identification corresponding to the registered network-based identification) (step S411'). Then, the processing proceeds to steps S112' and S113' described in the modification of the first embodiment. The processing, however, is performed by the terminal device 41', instead of the terminal device 11'.

[Other Modifications]

The present invention is not limited to the embodiments described above. In the embodiments described above, the terminal device and the key device communicate through the public network, for example. However, the terminal device and the key device can communicate through any of private networks, instead of the public network, and the network-based identification and the hierarchical network-based identification can be information corresponding to that private network.

In the embodiments described above, if the decryption authority authentication succeeds (yes in step S108 or S408), the key device generates and outputs the response information. However, the response information can be generated irrespective of whether the decryption authority authentication succeeds or fails; if the decryption authority authentication succeeds, the key device outputs the response information, and if the decryption authority authentication fails, the key device does not output the response information. Alternatively, if the decryption authority authentication succeeds, the key device can output correct response information to the terminal device; and if the decryption authority authentication fails, the key device can output dummy information (incorrect response information, in other words, response information which does not correspond to the decrypted value of the ciphertext) to the terminal device. An example of the dummy information is a random value.

In the fourth embodiment and its modification, the decryption key corresponding to the network-based identification corresponding to the network used by the terminal device is used. The decryption key corresponding to the network-based identification corresponding to the network used by the terminal device can also be used in the first to third embodiments and their modifications. That is, the decrypted value can be a value obtained by decrypting the ciphertext with the decryption key corresponding to the network-based identification. Examples of the decryption key corresponding to the network-based identification include a private key of the public-key encryption method when the network-based identification is a public key, a private key of the ID-based encryption method when the network-based identification is an identifier, a common key of the common-key encryption method when the network-based identification is a key identifier, and a private key of the function-type encryption method when the network-based identification is an attribute vector.

The embodiments described above can also be combined. For example, re-encryption processing or decryption processing of re-encrypted text described in the third embodiment or its modification can be performed in the fourth embodiment or its modification. In other words, the hierarchical network-based identification described in the fourth embodiment or its modification can be used as the network-based identification in the third embodiment or its modification; the decryption key corresponding to the hierarchical network-based identification described in the fourth embodiment or its modification can be used as the decryption key in the third embodiment or its modification. Alternatively, in the third embodiment and its modification, a selectable encryption key can be configured, as in the second embodiment or its modification. That is, the decryption key in the second embodiment or its modification can be used as the decryption key in the third embodiment or its modification.

In the embodiments and their modifications described above, network-based identification for network-based authentication is sent to the authentication apparatus; if the network-based authentication succeeds in the authentication apparatus, the network-based identification for the network-based authentication is sent to the key device; by determining, in the key device, whether the network-based identification corresponds to any of registered network-based identification included in a list, it is determined whether response information corresponding to a decrypted value corresponding to the ciphertext is output or not. Some types of network-based identification, however, could make it difficult for the key device to identify the user from the network-based identification for the network-based authentication and could make it difficult to manage decryption authorities by using the network-based identification for the network-based authentication. For example, when a cell phone is used as the terminal device, network-based identification such as IMEI or IMSI is used for network-based authentication, but in some cases, it is difficult for the key device to manage the decryption authorities by using IMEI or IMSI. If the FLET'S number is used as the network-based identification for the network-based authentication of the NGN, it can be difficult for the key device to manage the decryption authorities by using the FLET'S number in some cases. In many cases, management using general network-based identification such as very versatile telephone numbers is easier for the key device. Therefore, if a plurality of pieces of network-based identification is associated with a single network, some pieces of the network-based identification (such as IMEI, IMSI, FLET'S number, or MAC address) can be used for network-based authentication, and other pieces of the network-based identification (general network-based identification or the like) associated with (corresponding to) the network-based identification used for the network-based authentication can be used for managing decryption authorities. In other words, if network-based authentication by the authentication apparatus succeeds, the other network-based identification (ID information) associated with the network-based identification used in the network-based authentication or the network-based identification used in the network-based authentication and the other network-based identification associated with it are sent to the key device, instead of sending to the key device the network-based identification used for the network-based authentication. The key device determines whether the other network-based identification or the network-based identification used in the network-based authentication and the other network-based identification correspond to any of the registered network-based identification included in the list and thereby determines whether the response information corresponding to the decrypted value of the ciphertext is output. The registered network-based identification in that case can be the other network-based identification itself associated with the network-based identification with which the decryption service is permitted, information uniquely defined for the other network-based identification, a pair formed of network-based identification with which the decryption service is permitted and another network-based identification associated with it, or information uniquely determined for the pair.

Each type of processing described above may be executed not only time sequentially according to the order of description but also in parallel or individually when necessary or according to the processing capabilities of the devices that execute the processing. Appropriate changes can be made to the above embodiments without departing from the scope of the present invention.

When the configurations described above are implemented by the computer, the processing details of the functions that should be provided by each device are described in a program. When the program is executed by the computer, the processing functions described above are implemented on the computer. The program describing the processing details can be recorded in a computer-readable recording medium. An example of the computer-readable recording medium is a non-transitory recording medium. The non-transitory recording medium can be a magnetic storage device, an optical disc, a magneto-optical recording medium, or a semiconductor memory.

This program is distributed by selling, transferring, or lending a portable recording medium such as a DVD or a CD-ROM with the program recorded on it, for example. The program may also be distributed by storing the program in a storage of a server computer and transferring the program from the server computer to another computer through the network.

A computer that executes this type of program first stores the program recorded on the portable recording medium or the program transferred from the server computer in its storage. Then, the computer reads the program stored in its storage and executes processing in accordance with the read program. In a different program execution form, the computer may read the program directly from the portable recording medium and execute processing in accordance with the program, or the computer may execute processing in accordance with the program each time the computer receives the program transferred from the server computer. Alternatively, the above-described processing may be executed by a so-called application service provider (ASP) service, in which the processing functions are implemented just by giving program execution instructions and obtaining the results without transferring the program from the server computer to the computer.

At least a part of the processing functions in the embodiments described above may be implemented by hardware.

Additional Remark

The above embodiments and their modifications support the configurations of the following items.

[Item 1]

A key device comprising:

a registered-network storage which stores registered network-based identification corresponding to any of networks;

an input unit to which ciphertext and network-based identification is input;

a response unit which generates response information corresponding to a decrypted value of the ciphertext; and an output unit which outputs the response information when the network-based identification corresponds to the registered network-based identification.

[Item 2]

The key device according to Item 1, wherein the output unit outputs the response information to a network corresponding to the network-based identification corresponding to the registered network-based identification.

[Item 3]

The key device according to Item 1 or 2, wherein the network permits network-based authentication; and the network-based identification input to the input unit is information corresponding to a network where network-based authentication has succeeded.

[Item 4]

The key device according to one of Items 1 to 3, further comprising a key storage which stores a plurality of decryption keys, wherein information for identifying a decryption key is further input to the input unit, and the decrypted value is a value obtained by decrypting the ciphertext with a decryption key identified by the information for identifying the decryption key.

[Item 5]

The key device according to one of Items 1 to 4, wherein a re-encryption key is further input to the input unit, and the response information is information corresponding to re-encrypted text obtained by re-encrypting the decrypted value of the ciphertext with the re-encryption key.

[Item 6]

The key device according to Item 5, wherein the re-encryption key is a random value obtained by a terminal device to which the response information is input, and the terminal device holds a re-encrypted-text decryption key for decrypting the re-encrypted text.

[Item 7]

The key device according to one of Items 1 to 6, wherein the decrypted value is a value obtained by decrypting the ciphertext with a decryption key corresponding to the network-based identification.

[Item 8]

The key device according to one of Items 1 to 7, wherein the network-based identification is hierarchical network-based identification;

the registered network-based identification is information corresponding to any of hierarchical network-based identification;

the ciphertext has been encrypted by the hierarchical ID-based encryption method; and the decrypted value is a value obtained by decrypting the ciphertext with a decryption key corresponding to an identifier that includes the network-based identification.

[Item 9]

The key device according to Item 8, wherein the network-based identification corresponding to registered network-based identification means that the network-based identification is hierarchical network-based identification corresponding to the registered network-based identification or belongs to a lower level of the hierarchical network-based identification corresponding to the registered network-based identification.

[Item 10]

The key device according to one of Items 1 to 9, wherein the ciphertext is information corresponding to second ciphertext;

the response information is information for obtaining, by self-correction processing, a decrypted value of the second ciphertext or re-encrypted text obtained by re-encrypting the decrypted value of the second ciphertext.

[Item 11]

A key cloud system comprising:
a key device; and
a terminal device;
registered network-based identification corresponding to any of networks being stored in the key device;
ciphertext output from the terminal device and network-based identification corresponding to a network to which the terminal device is connected being input to the key device; and
the key device outputting response information corresponding to a decrypted value of the ciphertext when the network-based identification corresponds to the registered network-based identification.

[Item 12]

A decryption method comprising the steps of:
receiving ciphertext and network-based identification by an input unit; and
outputting response information corresponding to a decrypted value of the ciphertext from an output unit when the network-based identification corresponds to registered network-based identification, in which the registered network-based identification corresponding to any of networks is stored in a registered-network storage.

[Item 13]

A program for having a computer function as the key device according to one of Items 1 to 10.

[Item 14]

A computer-readable recording medium having stored thereon a program for having a computer function as the key device according to one of Items 1 to 10.

DESCRIPTION OF REFERENCE NUMERALS 1 to 4, 1' to 4': Key cloud systems
11 to 41, 11' to 41': Terminal devices
12 to 42, 12' to 42': Key devices
43: Key generation device

What is claimed is:

1. A key device comprising processing circuitry configured to implement:
a registered-network storage which stores registered network-based identification corresponding to registered computer networks;
an input unit to which ciphertext and inputted network-based identification, corresponding to a used computer network through which the ciphertext has been transmitted through, is input;
a response unit which generates response information corresponding to a decrypted value of the ciphertext, wherein the decrypted value is a value obtained by decrypting the ciphertext with a decryption key corresponding to the inputted network-based identification; and
an output unit which outputs the response information when the inputted network-based identification corresponds to the registered network-based identification,
wherein the computer networks include a network-based authentication function which is a user authentication technique for confirming that a user is accessing a respective network for communication from the respective network,
a plurality of different types of network-based identification are associated with the computer networks, at least a first type of the network-based identification is used for the network-based authentication, and at least a second type of the network-based identification associated with the first type of network-based identification is used for managing decryption authorities,
the inputted network-based identification input to the input unit is information corresponding to the computer network that is sent after network-based authentication has succeeded within the computer network,
the second type of network-based identification which is used for the managing decryption authorities is stored in association with the first type of network-based identification which is used for the network-based authentication of the computer network,
the key device cannot manage the decryption authorities by using the first type of network-based identification alone; and
the inputted network-based identification which is input to the input unit corresponds to the computer network where the network-based authentication has succeeded.

2. The key device according to claim 1, wherein the output unit outputs the response information to the computer network corresponding to the inputted network-based identification corresponding to the registered network-based identification.

3. The key device according to claim 1, wherein
a re-encryption key is further input to the input unit, and
the response information is information corresponding to re-encrypted text obtained by re-encrypting the decrypted value of the ciphertext with the re-encryption key.

4. The key device according to claim 3, wherein
the re-encryption key is a random value obtained by a terminal device to which the response information is input, and
the terminal device holds a re-encrypted-text decryption key for decrypting the re-encrypted text.

5. The key device according to claim 1, wherein
the inputted network-based identification is hierarchical network-based identification;
the registered network-based identification is information corresponding to hierarchical network-based identification;
the ciphertext has been encrypted by a hierarchical ID-based encryption method; and
the decryption key corresponds to an identifier that includes the inputted network-based identification.

6. The key device according to claim 5, wherein the inputted network-based identification corresponding to registered network-based identification means that the inputted network-based identification is hierarchical network-based identification corresponding to the registered network-based identification or belongs to a lower level of the hierarchical network-based identification corresponding to the registered network-based identification.

7. The key device according to one of claims 1, 2, 3, 4, 5, and 6, wherein
the ciphertext is information corresponding to second ciphertext;
the response information is information for obtaining, by self-correction processing, a decrypted value of the second ciphertext or re-encrypted text obtained by re-encrypting the decrypted value of the second ciphertext.

8. A key cloud system comprising processing circuitry configured to implement:
a key device; and
a terminal device;

registered network-based identification corresponding to registered computer networks being stored in the key device;

ciphertext output from the terminal device and inputted network-based identification, corresponding to a used computer network through which the ciphertext has already been transmitted through and to which the terminal device is connected, being input to the key device; and the key device outputting response information corresponding to a decrypted value of the ciphertext when the inputted network-based identification corresponds to the registered network-based identification, wherein the decrypted value is a value obtained by decrypting the ciphertext with a decryption key corresponding to the network-based identification, wherein the computer networks include a network-based authentication function which is a user authentication technique for confirming that a user is accessing a respective network for communication from the respective network, a plurality of different types of network-based identification are associated with the computer networks, at least a first type of the network-based identification is used for the network-based authentication, and at least a second type of the network-based identification associated with the first type of network-based identification is used for managing decryption authorities, the inputted network-based identification input to the key device is information corresponding to the computer network that is sent after network-based authentication has succeeded within the computer network, the second type of network-based identification which is used for the managing decryption authorities is stored in association with the first type of network-based identification which is used for the network-based authentication of the computer network, the key device cannot manage the decryption authorities by using the first type of network-based identification alone; and the inputted network-based identification which is input to the input unit corresponds to the computer network where the network-based authentication has succeeded.

9. A decryption method of a key device, the decryption method comprising the steps of:

receiving ciphertext and inputted network-based identification corresponding to a used computer network, through which the ciphertext has been transmitted through, by an input unit; and outputting response information corresponding to a decrypted value of the ciphertext from an output unit when the inputted network-based identification corresponds to registered network-based identification, in which the registered network-based identification corresponding to registered computer networks is stored in a registered-network storage, wherein the decrypted value is a value obtained by decrypting the ciphertext with a decryption key corresponding to the network-based identification, wherein the computer networks include a network-based authentication function which is a user authentication technique for confirming that a user is accessing a respective network for communication from the respective network, a plurality of different types of network-based identification are associated with the computer networks, at least a first type of the network-based identification is used for the network-based authentication, and at least a second type of the network-based identification associated with the first type of network-based identification is used for managing decryption authorities, the inputted network-based identification input to the input is information corresponding to the computer network that is sent after network-based authentication has succeeded within the computer network, the second type of network-based identification which is used for the managing decryption authorities is stored in association with the first type of network-based identification which is used for the network-based authentication of the computer network, the key device cannot manage the decryption authorities by using the first type of network-based identification alone; and the inputted network-based identification which is input to the input unit corresponds to the computer network where the network-based authentication has succeeded.

10. A non-transitory computer-readable recording medium storing a program for having a computer function as the key device according to one of claims 1, 2, 5, and 6.

11. A non-transitory computer-readable recording medium storing a program for having a computer function as the key device according to claim 7.

* * * * *